(12) United States Patent
Sheppard et al.

(10) Patent No.: US 10,979,324 B2
(45) Date of Patent: *Apr. 13, 2021

(54) METHODS AND APPARATUS FOR ESTIMATING TOTAL UNIQUE AUDIENCES

(71) Applicant: The Nielsen Company (US), LLC, New York, NY (US)

(72) Inventors: Michael R. Sheppard, Holland, MI (US); Jonathan Sullivan, Hurricane, UT (US); Peter Lipa, Tucson, AZ (US); Matthew B. Reid, Alameda, CA (US); Peter C. Doe, Ridgewood, NJ (US); Peng Fei Yi, Shanghai (CN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,487

(22) Filed: Jan. 13, 2020

(65) Prior Publication Data

US 2020/0228427 A1 Jul. 16, 2020

Related U.S. Application Data

(63) Continuation of application No. 16/388,666, filed on Apr. 18, 2019, now Pat. No. 10,536,358, which is a (Continued)

(51) Int. Cl.
*H04L 12/26* (2006.01)
*H04L 29/08* (2006.01)
*G06Q 30/02* (2012.01)

(52) U.S. Cl.
CPC .......... *H04L 43/062* (2013.01); *G06Q 30/02* (2013.01); *G06Q 30/0241* (2013.01);
(Continued)

(58) Field of Classification Search
CPC .......... G06Q 30/0241; G06Q 30/0277; G06Q 30/02; G06Q 30/0242; G06Q 30/0246;
(Continued)

(56) References Cited

U.S. PATENT DOCUMENTS

| 4,621,325 A | 11/1986 | Naftzger et al. |
| 5,113,518 A | 5/1992 | Durst, Jr. et al. |

(Continued)

FOREIGN PATENT DOCUMENTS

| AU | 2013205736 | 5/2013 |
| CN | 101077014 | 11/2007 |

(Continued)

OTHER PUBLICATIONS

United States Patent and Trademark Office, "Non-Final Office Action", issued in connection with U.S. Appl. No. 15/008,220, dated Jan. 25, 2018, 24 pages.

(Continued)

*Primary Examiner* — Kyung H Shin
(74) *Attorney, Agent, or Firm* — Hanley, Flight & Zimmerman, LLC

(57) ABSTRACT

Methods and apparatus for determining a unique audience exposed to media while reducing memory resources of a computing device are disclosed herein. Example instructions cause a machine to at least, based on impression requests from a plurality of client devices via a network, log a plurality of impressions corresponding to media accessed at the client devices; obtain a count of demographic impressions logged by a database proprietor; obtain a count of registered users of the database proprietor exposed to the media; and execute a process to determine a unique audience size by multiplying a count of the plurality of impressions by a square of the count of the registered users to generate a product; dividing the product by the count of the demo-
(Continued)

graphic impressions to generate a quotient; and determining the unique audience size based on a square root of the quotient.

27 Claims, 17 Drawing Sheets

Related U.S. Application Data continuation of application No. 15/008,220, filed on Jan. 27, 2016, now Pat. No. 10,270,673.

(52) U.S. Cl.
CPC ..... *G06Q 30/0242* (2013.01); *G06Q 30/0244* (2013.01); *G06Q 30/0246* (2013.01); *G06Q 30/0247* (2013.01); *G06Q 30/0257* (2013.01); *G06Q 30/0273* (2013.01); *H04L 43/0876* (2013.01); *H04L 67/02* (2013.01); *H04L 67/18* (2013.01); *H04L 67/306* (2013.01)

(58) Field of Classification Search
CPC ........... G06Q 30/0247; G06Q 30/0257; G06Q 30/0273; G06Q 30/0244; H04L 67/02; H04L 67/18; H04L 43/0876
See application file for complete search history.

(56) References Cited

U.S. PATENT DOCUMENTS

| | | |
|---|---|---|
| 5,214,780 A | 5/1993 | Ingoglia et al. |
| 5,675,510 A | 10/1997 | Coffey et al. |
| 5,793,409 A | 8/1998 | Tetsumura |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 6,035,339 A | 3/2000 | Agraharam et al. |
| 6,052,730 A | 4/2000 | Felciano et al. |
| 6,108,637 A | 8/2000 | Blumenau |
| 6,138,155 A | 10/2000 | Davis et al. |
| 6,141,694 A | 10/2000 | Gardner |
| 6,223,215 B1 | 4/2001 | Hunt et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 7,031,932 B1 | 4/2006 | Lipsky et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,181,412 B1 | 2/2007 | Fulgoni et al. |
| 7,260,837 B2 | 8/2007 | Abraham et al. |
| 7,363,643 B2 | 4/2008 | Drake et al. |
| 7,386,473 B2 | 6/2008 | Blumenau |
| 7,406,516 B2 | 7/2008 | Davis et al. |
| 7,526,538 B2 | 4/2009 | Wilson |
| 7,590,568 B2 | 9/2009 | Blumenau |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,882,054 B2 | 2/2011 | Levitan |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,060,601 B1 | 11/2011 | Brown et al. |
| 8,087,041 B2 | 12/2011 | Fu et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,180,112 B2 | 5/2012 | Kurtz et al. |
| 8,234,408 B2 | 7/2012 | Jungck |
| 8,235,814 B2 | 8/2012 | Willis et al. |
| 8,260,663 B1* | 9/2012 | Ranka ............... G06Q 30/0241 705/14.49 |
| 8,280,683 B2 | 10/2012 | Finkler |
| 8,302,120 B2 | 10/2012 | Ramaswamy |
| 8,307,006 B2 | 11/2012 | Hannan et al. |
| 8,370,489 B2 | 2/2013 | Mazumdar et al. |
| 8,402,027 B1 | 3/2013 | Dange et al. |
| 8,453,173 B1 | 5/2013 | Anderson et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,543,454 B2 | 9/2013 | Fleischman et al. |
| 8,600,796 B1 | 12/2013 | Sterne et al. |
| 8,631,122 B2 | 1/2014 | Kadam et al. |
| 8,688,524 B1 | 4/2014 | Ramalingam et al. |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,839,291 B1 | 9/2014 | Anderson et al. |
| 8,898,689 B2 | 11/2014 | Georgakis |
| 8,910,195 B1 | 12/2014 | Barney et al. |
| 8,930,701 B2 | 1/2015 | Burbank et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,117,217 B2 | 8/2015 | Wilson et al. |
| 9,215,288 B2 | 12/2015 | Seth et al. |
| 10,270,673 B1 | 4/2019 | Sheppard et al. |
| 10,536,358 B2 | 1/2020 | Sheppard et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0105604 A1 | 6/2003 | Ash et al. |
| 2004/0088212 A1 | 5/2004 | Hill |
| 2004/0107125 A1 | 6/2004 | Guheen et al. |
| 2004/0167928 A1 | 8/2004 | Anderson et al. |
| 2005/0033657 A1 | 2/2005 | Herrington et al. |
| 2005/0223093 A1 | 10/2005 | Hanson et al. |
| 2006/0089754 A1 | 4/2006 | Mortenson |
| 2006/0294259 A1 | 12/2006 | Matefi et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0010144 A1* | 1/2008 | Chatwin ............ G06Q 30/0275 705/14.45 |
| 2008/0091639 A1 | 4/2008 | Davis et al. |
| 2008/0126420 A1 | 5/2008 | Wright et al. |
| 2008/0201472 A1 | 8/2008 | Bistriceanu et al. |
| 2008/0222201 A1 | 9/2008 | Chen et al. |

(56) References Cited

U.S. PATENT DOCUMENTS

| | | |
|---|---|---|
| 2008/0235243 A1 | 9/2008 | Lee et al. |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0292587 A1 | 11/2009 | Fitzgerald |
| 2009/0327026 A1 | 12/2009 | Bistriceanu et al. |
| 2010/0004977 A1 | 1/2010 | Marci et al. |
| 2010/0076814 A1 | 3/2010 | Manning |
| 2010/0088152 A1 | 4/2010 | Bennett |
| 2010/0088373 A1 | 4/2010 | Pinkham |
| 2010/0070621 A1 | 5/2010 | Urdan et al. |
| 2010/0121676 A1 | 5/2010 | Jackson |
| 2010/0153175 A1 | 6/2010 | Pearson et al. |
| 2010/0161385 A1 | 6/2010 | Karypis et al. |
| 2010/0205057 A1 | 8/2010 | Hook et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2011/0016482 A1 | 1/2011 | Tidwell et al. |
| 2011/0087519 A1 | 4/2011 | Fordyce, III et al. |
| 2011/0131596 A1 | 6/2011 | Amsterdam et al. |
| 2011/0137733 A1 | 6/2011 | Baird et al. |
| 2011/0157475 A1 | 6/2011 | Wright et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0202500 A1 | 8/2011 | Warn et al. |
| 2011/0231240 A1 | 9/2011 | Schoen et al. |
| 2011/0246297 A1 | 10/2011 | Buchalter et al. |
| 2011/0246641 A1 | 10/2011 | Pugh et al. |
| 2011/0282730 A1 | 11/2011 | Tarmas |
| 2012/0005213 A1 | 1/2012 | Hannan et al. |
| 2012/0030037 A1 | 2/2012 | Carriero |
| 2012/0072469 A1 | 3/2012 | Perez et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0206331 A1 | 8/2012 | Gandhi |
| 2012/0215621 A1 | 8/2012 | Heffernan et al. |
| 2012/0239809 A1 | 9/2012 | Mazumdar et al. |
| 2012/0254466 A1 | 10/2012 | Jungck |
| 2012/0265606 A1 | 10/2012 | Patnode |
| 2012/0302222 A1 | 11/2012 | Williamson et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0066713 A1 | 3/2013 | Umeda |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0138506 A1 | 5/2013 | Zhu et al. |
| 2013/0145022 A1* | 6/2013 | Srivastava ............... G06F 16/48 709/224 |
| 2013/0204694 A1 | 8/2013 | Banister et al. |
| 2013/0212188 A1 | 8/2013 | Duterque et al. |
| 2013/0246609 A1 | 9/2013 | Topchy et al. |
| 2013/0282898 A1 | 10/2013 | Kalus et al. |
| 2013/0290070 A1 | 10/2013 | Abraham et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2014/0075004 A1 | 3/2014 | Van Dusen et al. |
| 2014/0082660 A1 | 3/2014 | Zhang et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0236705 A1 | 8/2014 | Shao |
| 2014/0279074 A1 | 9/2014 | Chen et al. |
| 2014/0298025 A1 | 10/2014 | Burbank et al. |
| 2015/0186403 A1 | 7/2015 | Srivastava et al. |
| 2015/0189500 A1 | 7/2015 | Bosworth et al. |
| 2015/0193816 A1 | 7/2015 | Toupet et al. |
| 2015/0262207 A1 | 9/2015 | Rao et al. |

FOREIGN PATENT DOCUMENTS

| | | |
|---|---|---|
| CN | 101222348 | 7/2008 |
| CN | 101505247 | 8/2009 |
| CN | 104520839 | 4/2015 |
| CN | 104541513 | 4/2015 |
| CN | 104584564 | 4/2015 |
| GB | 2176639 | 12/1986 |
| JP | H07262167 | 10/1995 |
| JP | 2001282982 | 10/2001 |
| JP | 2001357192 | 12/2001 |
| JP | 2002163562 | 6/2002 |
| JP | 2002373152 | 12/2002 |
| JP | 2004504674 | 2/2004 |
| JP | 2006127320 | 5/2006 |
| JP | 2006127321 | 5/2006 |
| JP | 2010039845 | 2/2010 |
| JP | 2010257448 | 11/2010 |
| KR | 20020037980 | 5/2002 |
| KR | 20090020558 | 2/2009 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9617467 | 6/1996 |
| WO | 9628904 | 9/1996 |
| WO | 9641495 | 12/1996 |
| WO | 2000041115 | 7/2000 |
| WO | 200207054 | 1/2002 |
| WO | 2003027860 | 4/2003 |
| WO | 2005013072 | 2/2005 |
| WO | 2005024689 | 3/2005 |
| WO | 2008150575 | 12/2008 |
| WO | 2010088372 | 8/2010 |
| WO | 2010104285 | 9/2010 |
| WO | 2011/097624 | 8/2011 |
| WO | 2012019643 | 2/2012 |
| WO | 2012/040371 | 3/2012 |
| WO | 2012/087954 | 6/2012 |
| WO | 2012/128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |

OTHER PUBLICATIONS

United States Patent and Trademark Office, "Non-Final Office Action", issued in connection with U.S. Appl. No. 15/008,220 dated Jul. 23, 2018, 10 pages.

United States Patent and Trademark Office, "Notice of Allowance and Fee(s) Due", issued in connection with U.S. Appl. No. 15/008,220 dated Nov. 29, 2018, 5 pages.

(56) References Cited

OTHER PUBLICATIONS

United States Patent and Trademark Office, "Non-Final Office Action", issued in connection with U.S. Appl. No. 16/388,666 dated Aug. 7, 2019, 6 pages.
United States Patent and Trademark Office, "Notice of Allowance and Fee(s) Due", issued in connection with U.S. Appl. No. 16/388,666 dated Aug. 21, 2019, 7 pages.

* cited by examiner

900 → $t_0$

| Websites | Recorded | | Population | |
|---|---|---|---|---|
| | Impressions | Audience | Impressions | Audience |
| A | 200 | 150 | 300 | $X_1$ |
| B | 300 | 175 | 500 | $X_2$ |
| Total | 500 | 250 | 800 | X |

902 → $t_1$

| Combinations | Impressions | | Audience | | | |
|---|---|---|---|---|---|---|
| | z1R | z2R | z1A | z2A | zA | z. |
| 1 | 0 | 0 | 0 | 0 | 0 | z. |
| 2 | 0 | I1 | 0 | A1 | zA | z. |
| 3 | I2 | 0 | A2 | 0 | zA | z. |
| 4 | I3 | I4 | A3 | A4 | zA | z. |

904 → $t_2$

| Constraint | $z^{(R)}$ | $z^{(A)}$ |
|---|---|---|
| 1 | 0.2500 | 2.2500 |
| 2 | 0.4167 | 1.4000 |
| And | $z_A = 0.1333$ | |
| UE | $z_* = 0.7500$ | |

906 → $t_3$

| Constraint | $z^{(T)}$ | $z^{(X)}$ |
|---|---|---|
| 1 | 0.3025 | 2.2500 |
| 2 | 0.5032 | 1.4000 |
| And | $z_X = 0.1333$ | |
| UE | $z_* = 0.6650$ | |

908 → $t_4$

| Combination | Impressions | | Audience | | | |
|---|---|---|---|---|---|---|
| | $z_1^{(T)}$ | $z_2^{(T)}$ | $z_1^{(X)}$ | $z_2^{(X)}$ | $z_X$ | $z_*$ |
| 1 | 0 | 0 | 0 | 0 | 0 | 1 |
| 2 | 1 | 0 | (i) | 0 | (v) | 1 |
| 3 | 0 | 1 | 0 | (iii) | (vi) | 1 |
| 4 | 1 | 1 | (ii) | (iv) | (vii) | 1 |

910 → $t_5$

| Websites | Recorded | | Population | |
|---|---|---|---|---|
| | Impressions | Audience | Impressions | Audience |
| A | 200 | 150 | 300 | 209.24 |
| B | 300 | 175 | 500 | 248.42 |
| Total | 500 | 250 | 800 | 334.96 |

FIG. 9

METHODS AND APPARATUS FOR ESTIMATING TOTAL UNIQUE AUDIENCES

CROSS REFERENCE TO RELATED APPLICATIONS

This Patent arises from a continuation of U.S. patent application Ser. No. 16/388,666, filed on Apr. 18, 2019, entitled "METHODS AND APPARATUS FOR ESTIMATING TOTAL UNIQUE AUDIENCES," which is a continuation of U.S. patent application Ser. No. 15/008,220, filed on Jan. 27, 2016, now U.S. Pat. No. 10,270,676, and entitled "METHODS AND APPARATUS FOR INCREASING THE ROBUSTNESS OF MEDIA SIGNATURES." Priority to U.S. patent application Ser. No. 16/388,666 and U.S. patent application Ser. No. 15/008,220 is claimed. U.S. patent application Ser. No. 16/388,666 and U.S. patent application Ser. No. 15/008,220 are hereby incorporated herein by reference in their entireties.

FIELD OF THE DISCLOSURE

This disclosure relates generally to monitoring media and, more particularly, to methods and apparatus for estimating total unique audiences exposed to media.

BACKGROUND

Traditionally, audience measurement entities have measured audience engagement levels for media based on registered panel members. That is, an audience measurement entity (AME) enrolls people who consent to being monitored into a panel. The AME then monitors those panel members to determine media (e.g., television programs, radio programs, movies, DVDs, advertisements, streaming media, websites, etc.) presented to those panel members. In this manner, the AME can determine exposure metrics for different media based on the collected media measurement data.

Techniques for monitoring user access to Internet resources, such as webpages, advertisements and/or other Internet-accessible media, have evolved significantly over the years. Internet-accessible media is also known as online media. Some known systems perform such monitoring primarily through server logs. In particular, entities serving media on the Internet can use known techniques to log the number of requests received at their servers for media.

BRIEF DESCRIPTION OF THE DRAWINGS

FIG. 9 illustrates example data associated with a third process of the example processes of FIGS. 1A-1C used by the example audience data calculator and/or the example impression data calculator of FIG. 3 to determine the unique audience and the frequency distribution of impression requests.

The figures are not to scale. Wherever possible, the same reference numbers will be used throughout the drawing(s) and accompanying written description to refer to the same or like parts

DETAILED DESCRIPTION

Figure 1A:
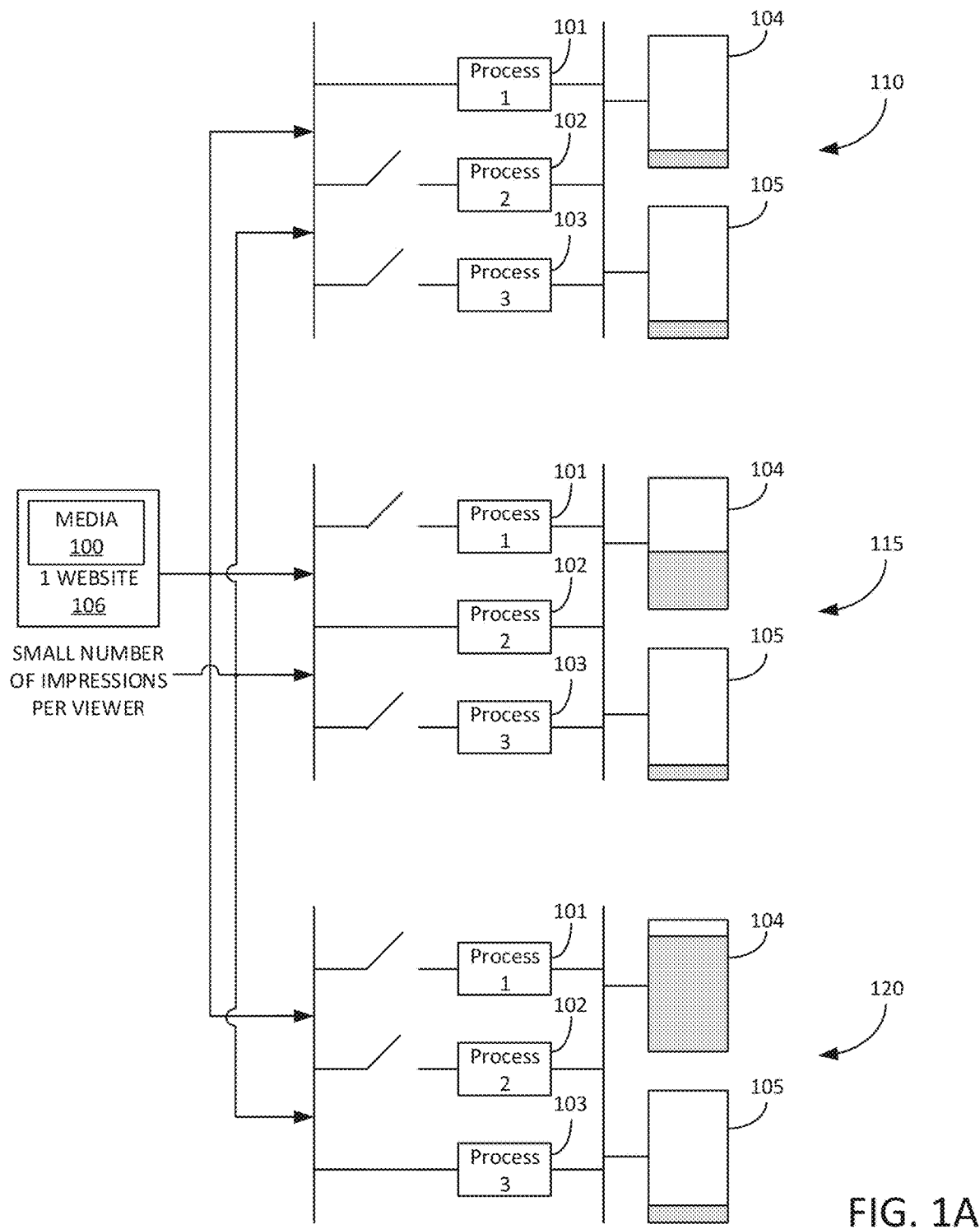
FIGS. 1A-1C illustrate example computer resource consumption for three example processes for determining a unique audience for particular media based on impressions and/or a determining frequency distribution of the impressions based on example data inputs.

Techniques for monitoring user access to Internet-accessible media, such as websites, advertisements, content and/or other media, have evolved significantly over the years. Internet-accessible media is also known as online media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server side log monitoring techniques described above. For example, Blumenau disclosed a technique wherein Internet media to be tracked is tagged with monitoring instructions. In particular, monitoring instructions (also known as a media impression request) are associated with the hypertext markup language (HTML) of the media to be tracked. When a client requests the media, both the media and the impression request are downloaded to the client. The impression requests are, thus, executed whenever the media is accessed, be it from a server or from a cache.

Impression requests cause monitoring data reflecting information about an access to the media to be sent from the client that downloaded the media to a monitoring entity. Sending the monitoring data from the client to the monitoring entity is known as an impression request. Typically, the monitoring entity is an AME that did not provide the media to the client and who is a trusted (e.g., neutral) third party for providing accurate usage statistics (e.g., The Nielsen Company, LLC). Advantageously, because the impression requests are associated with the media and executed by the client browser whenever the media is accessed, the monitoring information is provided to the AME (e.g., via an impression request) irrespective of whether the client corresponds to a panelist of the AME.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites Amazon.com, Buy.com, etc.), credit reporting sites (e.g., Experian), streaming media sites (e.g., YouTube, etc.), etc. These database proprietors set cookies and/or other device/user identifiers on the client devices of their subscribers to enable the database proprietor to recognize their subscribers when they visit their website.

The protocols of the Internet make cookies inaccessible outside of the domain (e.g., Internet domain, domain name, etc.) on which they were set. Thus, a cookie set in, for example, the amazon.com domain is accessible to servers in the amazon.com domain, but not to servers outside that domain. Therefore, although an AME might find it advantageous to access the cookies set by the database proprietors, they are unable to do so.

The inventions disclosed in Mainak et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mainak et al. accomplish this task by structuring the AME to respond to impression requests from clients (who may not be a member of an audience member panel and, thus, may be unknown to the audience member entity) by redirecting the clients from the AME to a database proprietor, such as a social network site partnered with the audience member entity, using an impression response. Such a redirection initiates a communication session between the client accessing the tagged media and the database proprietor. For example, the impression response received from the AME may cause the client to send a second impression request to the database proprietor. In response to receiving this impression request, the database proprietor (e.g., Facebook) can access any cookie it has set on the client to thereby identify the client based on the internal records of the database proprietor. In the event the client corresponds to a subscriber of the database proprietor, the database proprietor logs/records a database proprietor demographic impression in association with the client/user and subsequently forwards logged database proprietor demographic impressions to the AME.

As used herein, an impression is defined to be an event in which a home or individual accesses and/or is exposed to media (e.g., an advertisement, content, a group of advertisements and/or a collection of content). In Internet advertising, a quantity of impressions or impression count is the total number of times media (e.g., content, an advertisement or advertisement campaign) has been accessed by a web population (e.g., the number of times the media is accessed). In some examples, an impression or media impression is logged by an impression collection entity (e.g., an AME or a database proprietor) in response to a beacon request from a user/client device that requested the media. In some examples, a media impression is not associated with demographics. A panelist demographic impression is a media impression logged by an AME for which the AME has panelist demographics corresponding to a household and/or audience member exposed to media. As used herein, a database proprietor demographic impression is an impression recorded by a database proprietor in association with corresponding demographic information provided by the database proprietor in response to a beacon request from a client device of a registered subscriber of the database proprietor.

In the event the client does not correspond to a subscriber of the database proprietor, the database proprietor may redirect the client to the AME and/or another database proprietor. If the client is redirected to the AME, the AME may respond to the redirection from the first database proprietor by redirecting the client to a second, different database proprietor that is partnered with the AME. That second database proprietor may then attempt to identify the client as explained above. This process of redirecting the client from database proprietor to database proprietor can be performed any number of times until the client is identified and the media exposure logged, or until all database partners have been contacted without a successful identification of the client. In some examples, the redirections occur automatically so the user of the client is not involved in the various communication sessions and may not even know they are occurring.

Periodically or aperiodically, the partnered database proprietors provide their logs and demographic information to the AME, which then compiles the collected data into statistical reports identifying audience members for the media.

Example techniques disclosed herein use database proprietors to identify audience demographics based on impression requests from client devices to track quantities of impressions attributable to users of those client devices. In some examples, the database proprietor demographic impressions collected by a database proprietor (e.g., Facebook, Yahoo, Google, etc.) may be inaccurate and/or incomplete when the database proprietor does not have complete coverage of device/user identifiers cookies) at all of the client devices associated with impression requests or, more generally associated with an impression to be logged. As used herein in this context, coverage represents the extent to which a database proprietor has set cookies or, more generally, device/user identifiers in client devices associated with beacon requests. For example, if only 50% of client devices that send an impression request associated with a media impression to the database proprietor have a cookie set therein by the database proprietor, then the database proprietor has 50% coverage of such client devices. A client device may not have a cookie set by the database proprietor in its web browser if, for example, a user does not have an account with the database proprietor or if the user has an account with the database proprietor but has cleared the cookie cache and deleted the database proprietor's cookie before or at the time of a media exposure. In yet other examples, the database proprietor may set a cookie on the client device but the client device does not correspond to a registered user of the database proprietor. In any of such examples, the database proprietor would not be able to identify the user associated with one or more media impressions and, thus, would not report any database proprietor demographic impressions for those impressions.

Examples to estimate a unique audience size for logged media impressions based on logged database proprietor demographic impressions are disclosed herein. In some examples, estimates of the unique audience size are determined from database proprietor demographic impression data collected by database proprietors. In some disclosed examples, an AME estimates a unique audience size using a number of media impressions, a number of recorded (e.g., logged) database proprietor demographic impressions, a frequency distribution of the recorded database proprietor demographic impressions across a partial audience and the number of people associated with the database proprietor demographic impressions (e.g., the partial audience). The number of recorded database proprietor demographic impressions and the partial audience size can be determined from the frequency distribution of the recorded database proprietor demographic impressions. As used herein, a frequency distribution is indicative of (1) a total quantity of unique audience members who have not been exposed to a particular media, (2) a total quantity of unique audience members who have been exposed to the particular media exactly once, (3) a total quantity of unique audience members who have been exposed to the particular media exactly twice, etc.

The people associated with the database proprietor demographic impressions at the database proprietor are referred to as the partial audience. The term partial audience is used because some individuals associated with the media impression requests sent to the AME, may not be registered with the database proprietor. As such, the database proprietor will not record (e.g., log) media impressions for these individuals in response to impression requests redirected by the AME to the database proprietor because these individuals are not registered with the database proprietor.

In some disclosed examples, an AME sends a list of logged impressions for particular online media to one or more database proprietor(s). The database proprietor(s) respond with a number of recorded database proprietor demographic impressions from the partial audience, and the size of the partial audience. In other examples, the database proprietor may receive media impression requests for media directly from client devices (e.g., without being redirected by the AME) that access the media via one or more websites. In some examples, accessing media may include media retrieved from a server through a website in response to a user-request specifically requesting the media. In some examples, the media could be delivered by a server for presentation via a website without a user intentionally requesting the media. For example, some media is presented on a website as a result of the website being programmed to request and present the media as part of the website being rendered. The database proprietor may record a quantity of media impressions (e.g., impressions that are not matched with a user of the database proprietor) and a quantity of database proprietor demographic impressions (e.g., impressions that are matched with a user of the database proprietor). In these other examples, the database proprietor will provide the total quantity of media impressions not matched to a user of the database proprietor and the total quantity of database proprietor demographic impressions (e.g. the partial audience) to the AME.

Using examples disclosed herein, the AME determines an estimate size of an audience based on logged impressions using techniques designed to optimize computer resources (e.g., processor resources and memory resources) based on the number and/or complexity (e.g., number of websites associated with the logged impressions and/or number of logged impressions per user) of the logged impressions. In particular, three different UA/FD processes are disclosed herein to estimate unique audience sizes. The example UA/FD processes have different trade-offs between memory resource usage and processor resource usage under different circumstances. For example, a first unique audience and/or frequency distribution process, herein referred to as "UA/FD process 1," requires the least amount of processor resources (e.g., is least computationally intensive) and requires the least amount of memory resources. Example UA/FD process 1 is configured to estimate unique audiences based on logged media impressions and database proprietor demographic impressions associated with media accessed via a website. A second unique audience and/or frequency distribution process, herein referred to as "UA/FD process 2," requires more processor resources and memory resources than UA/FD process 1. Example UA/FD process 2 is configured to estimate unique audiences based on logged impressions and database proprietor demographic impressions associated with media accessed via one or more websites. Although UA/FD process 2 requires more processor resources and memory resources, the estimates from UA/FD process 2 are more accurate than UA/FD process 1 because UA/FD process 2 uses data (e.g., logged impressions) corresponding to media accesses via more than one website to estimate unique audiences. A third unique audience and/or frequency distribution process, herein referred to as "UA/FD process 3," requires the most processor resources, but less memory resources than UA/FD process 2. UA/FD process 3 is designed to estimate unique audiences based on logged impressions and audience data corresponding to media accesses via one or more websites.

In some examples, although UA/FD process 3 requires the most processor resources, UA/FD process 3 is usable under certain situations in which UA/FD processes 1 and 2 disclosed herein are not capable to determine unique audience. For example, the AME may receive impression requests and database proprietor demographic impressions associated with media accessed via hundreds of websites, where each person may have been exposed to the media hundreds of times. In such an example, UA/FD process 1 and UA/FD process 2 may not be usable to calculate the unique audience due to the large number of websites and/or impressions. For example, UA/FD process 1 is only used to determine a unique audience based on impressions corresponding to media accessed via one website. In addition, UA/FD process 2 may not be usable because a processor system (e.g., a computer) may not have sufficient available memory resources for UA/FD process 2 to process the large number of impressions from the hundreds of websites through which the media was accessed. In such an example, by adjusting for available processor resources and memory resources, UA/FD process 3 may be the relatively best solution of the three UA/FD processes disclosed herein to estimate a unique audience for the media accessed via the hundreds of websites.

Figure 1B:
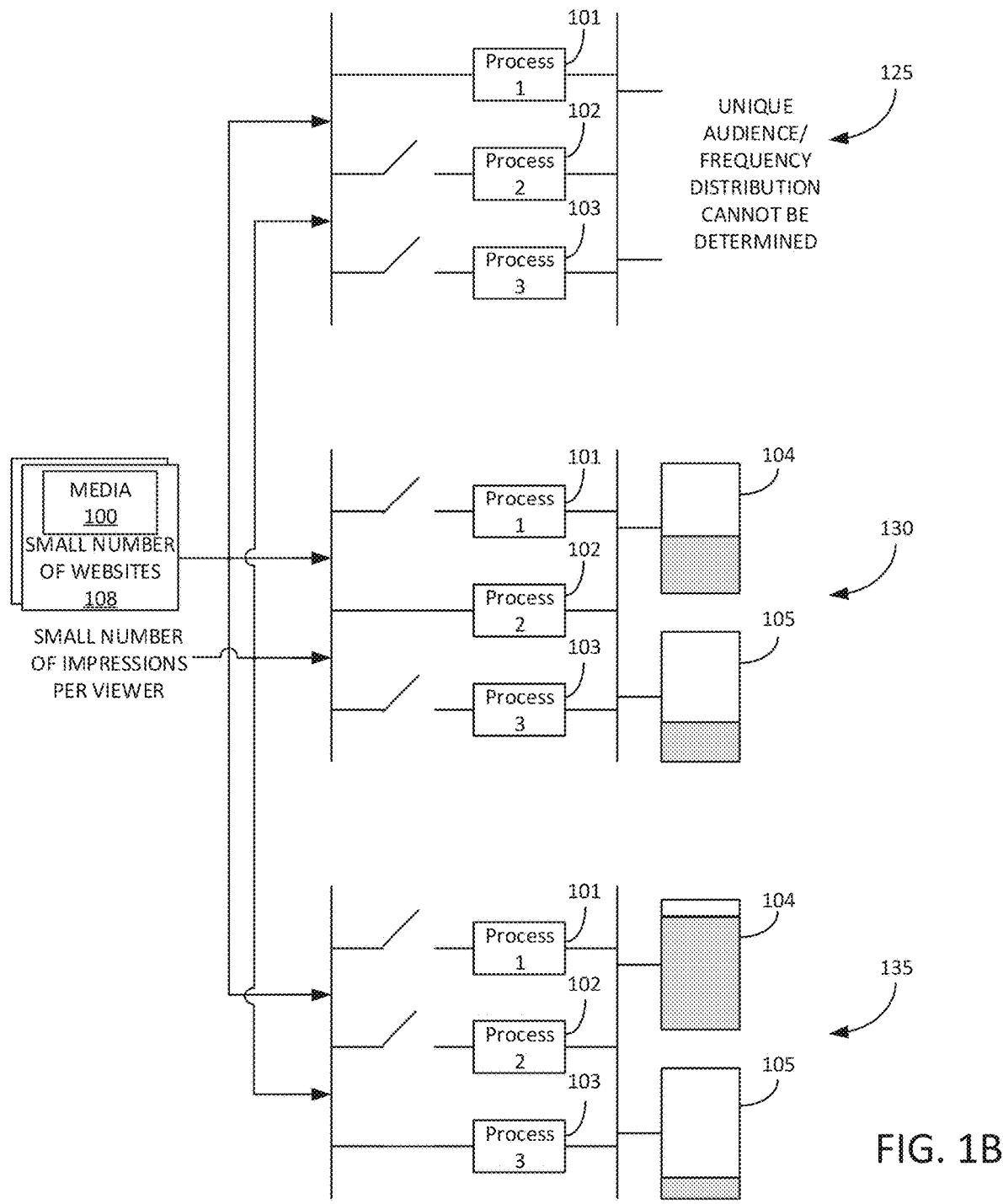
Figure 1C:
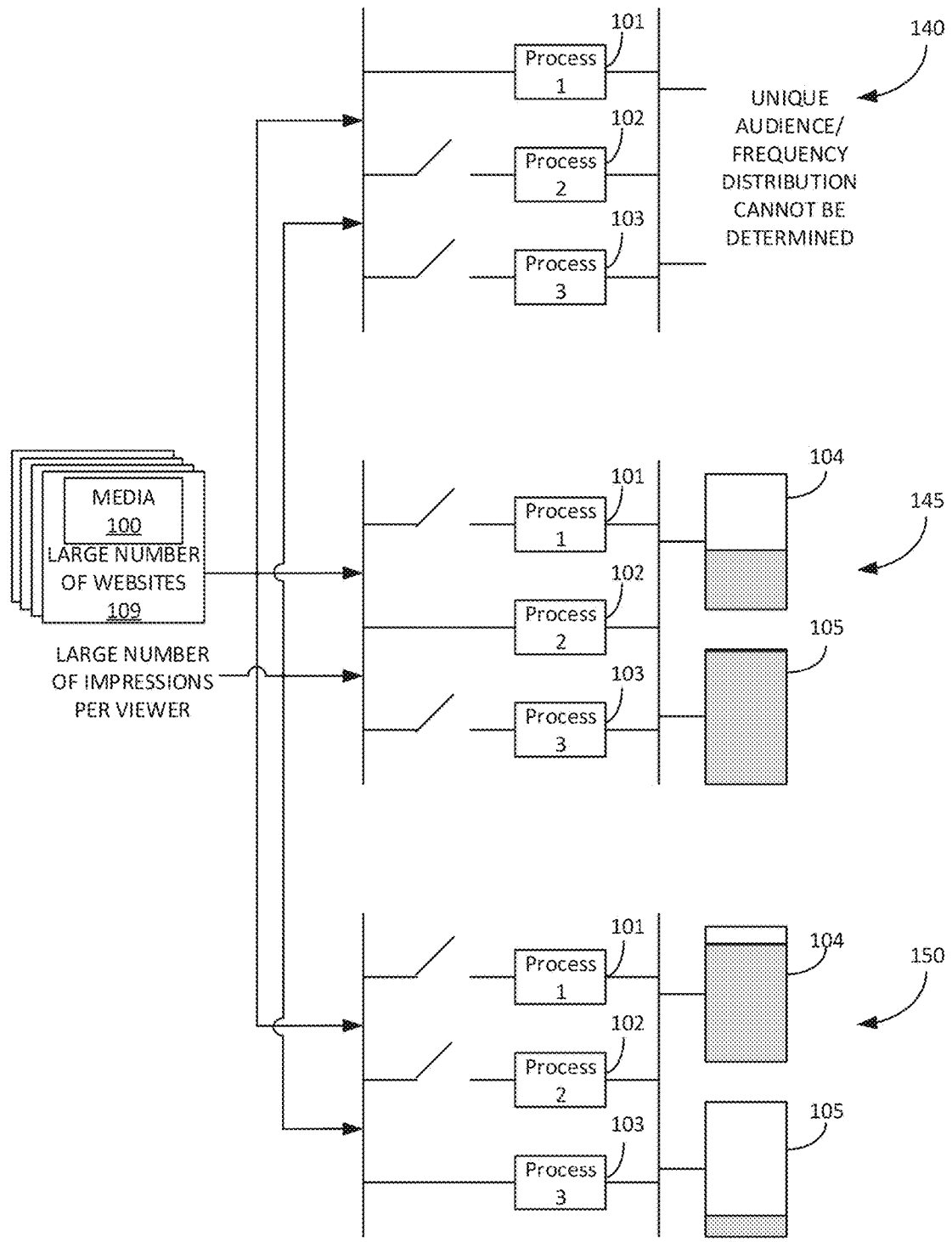

FIGS. 1A-1C include example situations 110, 115, 120, 125, 130, 135, 140, 145, 150 including example media 100, an example UA/FD process 1 101, an example UA/FD process 2 102, an example UA/FD process 3 103, example processor resources 104, example memory resources 105, an example webpage 106 example webpages 108, and example webpages 109. FIGS. 1A-1C illustrate amounts of the example processor resources 104 and the example memory resources 105 required for different ones of the example situations 110-150 based on the example UA/FD processes 101, 102, 103. The list of example situations is not an exhaustive list of possible situations that can be handled by the three example UA/FD processes.

As described above, the example UA/FD process 1 101 requires the least amount of the example processor resources 104 and requires the least amount of the example memory resources 105. The example UA/FD process 1 101 uses the principle of maximum entropy and minimum cross entropy. Given (1) an unspecified univariate distribution (A) with unknown probabilities, $q_k$, (where k can be any on-negative integer), (2) a known expected value $E[A]=\mu_1$, and (3) a known initial probability $q_o=P[A=0]$, the principle of maximum entropy is used to determine the unspecified univariate distribution (A). To determine the unspecified univariate distribution (A), Equation 1 below is determined.

$$\text{maximize } Q, H = -\Sigma_{k=0}^{\infty} \log(q_k), \quad \text{Equation 1}$$

subject to $q_0$ given $\Sigma_{k=0}^{\infty} q_k = 1$ and $\Sigma_{k=0}^{\infty} k q_k = \mu_1$ The solution is a zero-modified geometric distribution of the form $q_0$ given $q_k = Cr^k$ where $k=1, 2, \ldots, \infty$, $$C = \frac{(1-q_0)^2}{\mu_1 + q_0 - 1}, \text{ and } r = \frac{\mu_1 + q_0 - 1}{\mu_1}.$$

Once the unspecified univariate distribution (A) is determined, the principle of minimum cross entropy is used to determine a second unspecified univariate distribution (B) with probabilities $p_k$ on the same mathematical domain as the first unspecified univariate distribution (A), with constraint $E[B]=\mu_2$. Calculating for the initial probability $p_0=P[B=0]$ results in a simple and accurate estimation for a unique audience based on logged impressions corresponding to media associated with one website.

The solution becomes a previous distribution to a minimize cross entropy problem (e.g., q is the prior distribution and p is the unknown distribution to be solved) as shown in Equation 2 below.

$$\text{minimize } P, D(P:Q) = p_0 \log\left(\frac{p_0}{q_0}\right) + \sum_{k=1}^{\infty} p_k \log\left(\frac{p_k}{Cr^k}\right), \quad \text{Equation 2}$$

subject to $\sum_{k=0}^{\infty} p_k = 1$ and $\sum_{k=0}^{\infty} k p_k = \mu_2$ The solution is a zero-modified geometric distribution:

$$p_0 = s_0 q_0, p_k = s_0 s_1^k Cr^k, \text{ where } k=1,2,\ldots,\infty.$$

In the illustrated example, $s_0$ and $s_1$ are solved to satisfy the constraint $\Sigma_{k=0}^{\infty} p_k = 1$ and $\Sigma_{k=0}^{\infty} k p_k = \mu_2$). The zero-modified geometric distribution ($p_k$) is a unique solution. The distribution ($p_k$) is plugged into the first constraint (e.g., $\Sigma_{k=0}^{\infty} p_k = 1$) and solved for s to determine Equation 3 below.

$$s_1 = \frac{p_0 q_0 - q_0}{r(-Cp_0 + p_0 q_0 - q_0)}, \quad \text{Equation 3}$$

Substituting $s_1$ back into $p_k$ and applying the second constraint (e.g., $\Sigma_{k=0}^{\infty} k p_k = \mu_2$) results in Equation 4 below $\mu_2$:

$$\mu_2 = \frac{(p_0 - 1)(p_0(\mu_1 q_0 + q_0 - 1) - q_0(\mu_1 + q_1 - 1))}{p_0(q_0 - 1)^2}, \quad \text{Equation 4}$$

Rearranging (e.g., using known mathematical properties) Equation 4 results in Equation 5 below:

$$\frac{\left(\frac{\mu_1}{1-q_0} - 1\right)}{\left(\frac{1-q_0}{q_0}\right)} = \frac{\left(\frac{\mu_2}{1-p_0} - 1\right)}{\left(\frac{1-p_0}{p_0}\right)}, \quad \text{Equation 5}$$

The example UA/FD process 1 101 estimates a unique audience (X) in a universe population (U) that was exposed to the example media 100 (e.g., by sending an impression request associated with the media) using Equation 5 above. Additionally, a total number of logged media impressions (T), a total number of database proprietor demographic impressions (e.g., logged media impressions matched to a user of a database proprietor) (R), and a total identified database proprietor audience exposed to the media 100 (A) are also utilized in Equation 5 above. The example UA/FD process 1 101 equates $$q_0 \text{ to } 1-\frac{A}{U}, \mu_1 \text{ to } \frac{R}{U}, p_0 \text{ to } 1-\frac{X}{U}, \text{ and } \mu_2 \text{ to } \frac{T}{U}$$

to produce a first unique audience sub-process $$\frac{(R-A)(U-A)}{A^2} = \frac{(T-X)(U-X)}{X^2}$$

which is used by UA/FD process 1 101 to determine the total unique audience (X).

In some examples, when the universe is large (e.g., larger than a threshold size) and the number of logged impressions (e.g., R and T) is small (e.g., based on a threshold) relative to the audience sizes (e.g., A and X), the first unique audience sub-process can be simplified to a second unique audience sub-process. The second unique audience sub-process is $$\frac{A^2}{R-A} = \frac{X^2}{T-X}.$$

In some examples, when the universe is large and the number of logged impressions (e.g., R and T) are large (e.g., based on the threshold) relative to the audience sizes (e.g., A and X), the second unique audience sub-process can be simplified to a third unique audience sub-process. The third unique audience sub-process is $$\frac{A^2}{R} = \frac{X^2}{T}.$$

The example UA/FD process 1 101 applies data associated with the impressions of a particular media to one of the first, second, or third unique audience sub-processes based on the thresholds. Additionally, the example UA/FD process 1 101 can determine the number of people in the unique audience associated with exactly one logged impression, exactly two logged impressions, etc. (e.g., a frequency distribution)

based on a geometric distribution formula (e.g., $P(Z=k)=(1-p)^{k-1}p$, where $$p = \frac{X}{T}$$

and $k \in \{1, 2, \ldots, \infty\}$).

Since the three equations are simple to compute, processor resources required for the example UA/FD process 1 101 to determine a unique audience are low. Additionally, since only A, R, T, and U are required to be stored in memory, required memory for the example UA/FD process 1 101 is low.

As described above, the example UA/FD process 2 102 requires more processor resources and memory than the example UA/FD process 1 101. However, the example UA/FD process 2 102 can determine a unique audience based on data from one or more websites associated with one or more database proprietors. Additionally, if the estimate is based on two or more websites, the estimate is more accurate. The example UA/FD process 2 102 is derived from the process of maximum entropy and minimum cross entropy. The example UA/FD process 2 102 constructs an audience/impressions model constraint matrix (e.g., $C_Q$) and an audience/impressions total constraint vector (e.g., $D_Q$) to represent the total audience exposed to media based on one or more logged impressions. The example audience/impressions representation constraint ($C_Q$) matrix includes rows on constraints associated with a universe population, a total audience, an expected value of the total media impressions, etc., as further described below in connection with FIG. 6.

The unique audiences exposed to media associated with logged impressions can be determined by solving for an impression characteristics column vector (Q). The impressions characteristics column vector (Q) includes probabilities representing a number or people associated with zero impressions corresponding to website A and/or website B, one impression from website A and/or website B, two impressions from website A and/or website B, and/or any combination thereof. The example UA/FD process 2 102 determines impressions characteristic column vector (Q) using Equation 6 below.

maximize $Q, H = -\Sigma_{k=0}^{\infty} q_k \log(q_k)$,     Equation 6 subject to $C_Q Q = D_Q$.

To solve the total unique audience for logged impressions associated with the example media 100, the example UA/FD process 2 102 uses impressions characteristics column vector (Q) as the previous distribution for estimating the same distribution of probabilities based on audience (e.g., population) characteristics (e.g., P) using different constraints. The audience characteristics (P) are used to determine the total unique audience, as further described in FIG. 6. To determine the audience characteristics (P), the example UA/FD process 2 102 uses Equation 7 for below for determining the audience characteristics (P).

minimize $P$, $D(P:Q) = p_k \log\left(\frac{p_k}{q_k}\right)$,     Equation 7 subject to $C_P P = D_P$

Since the example UA/FD process 2 102 involves a system of non-linear equations, the example processor resources 104 required to determine the unique audience is higher than the resources required to determine the unique audience using the example UA/FD process 1 101. Additionally, since the example UA/FD process 2 102 stores the audience/impression model constraint matrix ($C_Q$), the audience/impressions total constraint vector ($D_Q$), the impressions characteristics vector (Q), and the audience characteristics (P), the amount of memory resources 105 required for the example UA/FD process 2 102 is more than the amount of the example memory resources 105 required for the example UA/FD process 1 101. However, as described above, the example UA/FD process 1 101 cannot determine a unique audience based on logged impressions corresponding to media accessed via one or more websites.

The example UA/FD process 3 103 requires the most processor resources, but less memory than the example UA/FD process 2 102. As the number of websites associated with a request to log and/or the number of logged impressions per person per website increases, the amount of the example memory resources 105 associated with the example UA/FD process 2 102 becomes substantially large. In some examples, there is not enough of the example memory resources 105 to store all the values associated with the example UA/FD process 2 102. In such examples, the UA/FD process 3 103 may be used to determine the unique audience and/or frequency distribution, because the UA/FD process 3 103 uses less memory to determine the unique audience and/or frequency distribution for the large number of websites and/or logged impressions.

The example UA/FD process 3 103 decreases the amount of required memory resources by calculating a combination of a set of the probabilities (e.g., to represent both the audience characteristics and the impression characteristics) associated with the example UA/FD process 2 102, instead of calculating all of the audience characteristics and the impression characteristics individually. For example, media exposures from two websites may have billions of probabilities to represent the impressions and audience characteristics, depending on the number of exposures per person. The example UA/FD process 2 102 calculates and stores the billions of probabilities individually, while the example UA/FD process 3 103 only determines and stores four combinations.

The example UA/FD process 3 103 creates a combination matrix by enumerating all combinations that can occur, with each column being a constraint corresponding to a webpage. In some examples, the constraints may be logged impressions corresponding to a first website, logged impressions corresponding to a second website, a total number of impressions, a total audience, etc. The example UA/FD process 3 103 utilizes properties of the geometric series infinite summations to create a general formula for N websites, as shown in Equations 8 and 9 below.

$$\text{impressions} \propto \sum_{i=1}^{\infty}\sum_{j=1}^{\infty}\sum_{k=1}^{\infty} z_1^{(a_0+a_1 i+a_2 j+a_3 k)} z_2^{(b_0+b_1 i+b_2 j+b_3 k)} = \frac{z_1^{(a_0+a_1+a_2+a_3)} z_2^{(b_0+b_1+b_2+b_3)}}{\left(1-z_1^{a_1} z_2^{b_1}\right)\left(1-z_1^{a_2} z_2^{b_2}\right)^2 \left(1-z_1^{a_3} z_2^{b_3}\right)},$$ Equation 8

$$\text{audience} \propto \sum_{i=1}^{\infty}\sum_{j=1}^{\infty}\sum_{k=1}^{\infty} j * z_1^{(a_0+a_1 i+a_2 j+a_3 k)} z_2^{(b_0+b_1 i+b_2 j+b_3 k)} = \frac{z_1^{(a_0+a_1+a_2+a_3)} z_2^{(b_0+b_1+b_2+b_3)}}{\left(1-z_1^{a_1} z_2^{b_1}\right)\left(1-z_1^{a_2} z_2^{b_2}\right)^2 \left(1-z_1^{a_3} z_2^{b_3}\right)},$$ Equation 9 where $z_i$ is representative of the $i^{th}$ constraint.

The example UA/FD process 3 103 creates a column based on a union of longed impressions and the population. The example UA/FD process 3 103 solves for N z values (e.g., exponents of LaGrangian multipliers for each constraint used during optimization) to satisfy the N constraints. The example UA/FD process 3 103 calculates the N z values using a system of non-linear equations. The example UA/FD process 3 103 modifies the z values corresponding to population constraints to solve for the population constraints. Although the example UA/FD process 3 103 is the most computationally intensive UA/FD process requiring the most processor resources, it requires less of the example memory resources 105 than the example UA/FD process 2 102.

FIG. 1A illustrates the example processor resources 104 and the example memory resources 105 required to estimate a unique audience and/or frequency distribution corresponding to logged impressions in the example situations 110, 115, 120. In the example situations 110, 115, 120, an AME determines a unique audience based on impressions logged by a database proprietor for media 100 presented to numerous audience members via one webpage 106. Additionally, the example situations 110, 115, 120 include a small number of impressions per viewer (e.g., less than 10 impressions per person). In some examples, the AME may receive a total number of impressions associated with the example media 100 (e.g., a total number of impressions logged for the media 100). Additionally, the AME may receive aggregate database proprietor impression data from a database proprietor based on the media 100. In examples disclosed herein, aggregate database proprietor impression data is a reporting of processed impression totals and other metrics based on impressions logged by the database proprietor for numerous audience members exposed to the media 100. For example, the database proprietor may generate the aggregate database proprietor impression data by tallying, averaging, de-duplicating and/or performing any other mathematical and/or filtering operations on database proprietor demographic impressions logged by the database proprietor for the media 100 exposed to numerous audience members. In some examples, the database proprietor may also generate aggregate database proprietor impression data by associating impression metrics with demographic groups. In some examples, the aggregate database proprietor impression data includes a total number of unique people exposed to the example media 100 that are registered subscribers of the database proprietor (e.g., a partial audience corresponding to registered database proprietor users) and a total number of database proprietor demographic impressions corresponding to the partial audience.

As shown in the example situation 110, when the example UA/FD process 1 101 calculates the unique audience for logged impressions associated with the media 100 from the example website 106 with a small number of impressions per viewer, the example processor resources 104 and the example memory resources 105 used for such calculations are low. As shown in the example situation 115, the example UA/FD process 2 102 requires more of the example processor resources 104 than the example UA/FD process 1 101 and less of the example resources 104 than the example UA/FD process 3 103. Additionally, the example memory resources 105 needed for the example UA/FD process 2 102 remain relatively low. As shown in the example situation 120, the example UA/FD process 3 103 uses more of the example processor resources 104 than the UA/FD process 1 101 and the UA/FD process 2 102, but the example memory resources 105 remain relatively low. In the illustrated example of FIG. 1A, the example UA/FD process 1 101 is the optimal UA/FD process to use relative to the UA/FD process 2 102 and the UA/FD process 3 103 because it uses less of both the example processor resources 104 and the example memory resources 105 than used by the example process 2 102 and the example process 3 103.

FIG. 1B illustrates the example processor resources 104 and the example memory resources 105 required to estimate a unique audience and/or frequency distribution in the example situations 125, 130, 135. In the example situations 125, 130, 135, an AME determines unique audiences corresponding to impressions logged by a database proprietor for the example media 100 presented to numerous audience members via the example small number of websites 108 (e.g., more than one but less than a threshold number (5)). The unique audiences may include unique audiences for each website of the small number of websites 108 as well as a total unique audience for all the websites 108. Additionally, the example situations 125, 130, 135 include a small number of impressions per viewer (e.g., 2-10 impressions per viewer). In some examples, the AME may receive a total number of logged impressions associated with the media 100. Additionally, the AME may receive aggregate database proprietor impression data from one or more database proprietors based on the media 100. In some examples, the aggregate database proprietor impression data includes a total number unique people exposed to the media 100 that are registered to the one or more database proprietors (e.g., the partial audience corresponding to registered database proprietor users) and a total number of logged database proprietor demographic impressions corresponding to the partial audience.

In the example situation 125, the example UA/FD process 1 101 cannot be used determine a unique audience for each of the example small number of webpages 108 (e.g., a unique audience for website A, a unique audience for website B, etc.). That is, the example UA/FD process 1 101 is configured to determine a unique audience for a single website such as the website 106 of FIG. 1A, but not for numerous websites. As shown in the example situation 130, the example UA/FD process 2 102 requires less of the example processor resources 104 than the example UA/FD process 3 103 selected at situation 135. Additionally, the example memory resources 105 required for the example UA/FD process 2 102 is more than the example memory resources 105 associated with the example UA/FD process 3 103 selected at situation 135. As shown in the example situation 135, the example UA/FD process 3 103 requires more of the example processor resources 104 than in the example process 2 102. Additionally, the required example memory resources 105 remains relatively lower than in the UA/FD process 2 102. In the illustrated example of FIG. 1B, the determination of which UA/FD process is optimal is based on the available processor resources 104 and/or the example memory resources 105 of a computer (e.g., the processor system 1000 of FIG. 10). For example, in a system where the available memory resources 105 are low, the optimal process may be a process that requires less memory resources 105. In some examples, the example processor resources 104 and/or the example memory resources 105 are weighted based on user and/or manufacture preferences to determine which UA/FD process is optimal for particular circumstances of a number of websites and a number of impressions. For example, if the system operating the UA/FD processes has a small amount of the example processor resources 104 but a large amount of the example memory resources 105, a user may give more weight to the processor resources 104 in order to select a process that uses more processor resources 104.

FIG. 1C illustrates the example processor resources 104 and the example memory resources 105 required to estimate a unique audience and/or frequency distribution in the example situations 140, 145, 150. The example situations 140, 145, 150 may require an AME to determine a unique audience based on impressions logged by a database proprietor for the example media 100 presented to numerous audience members via the example large number of websites 109 (e.g., more than a threshold number). Additionally, the example situations 140, 145, 150 include a large number of impressions per viewer (e.g., more than 10). In some examples, the AME may receive a total number of media impressions logged for the media 100. Additionally, the AME may receive aggregate database proprietor impression data from one or more database proprietors based on the media 100. In some examples, the aggregate database proprietor impression data includes a total number of unique people exposed to the media 100 that are registered subscribers of the database proprietor (e.g., the partial audience corresponding to registered database proprietor users) and a total number database proprietor demographic impressions corresponding to the partial audience.

In the example situation 140, the example UA/FD process 1 101 cannot be used to determine a unique audience for each of the example large number of websites 109 (e.g., a unique audience for website A, a unique audience for website B, etc.). That is, the example UA/FD process 1 101 is configured to determine a unique audience for a single website such as the website 106 of FIG. 1A, but not for numerous websites. As shown in the example situation 145, the example UA/FD process 2 102 requires less of the example processor resources 104 than the example UA/FD process 3 103 selected at situation 150. Additionally, the example memory resources 105 usage for the example UA/FD process 2 102 selected at situation 145 is more than the example memory resources 105 associated with the example UA/FD process 3 103 selected at situation 150. In some examples, there may not be enough of the example memory resources 105 to determine a solution (e.g., when the number of websites and/or the number of impressions per view are sufficiently large) using the UA/FD process 2 102. In such examples the unique audience cannot be determined using the example UA/FD process 2 102. As shown in the example situation 150, the example UA/FD process 3 103 requires more of the example processor resources 104 and less of the example memory resources 105 than the example process 2 102 selected at situation 145. In the illustrated example of FIG. 1C, the determination of which UA/FD process is optimal is based on the available processor resources 104 and/or the example memory resources 105. If, as described above, there is not enough of the example memory resources 105 to determine a solution using the example UA/FD process 2 102, a user may give more weight to the processor resources 104 in order to select a process that uses more processor resources 104.

Figure 2:
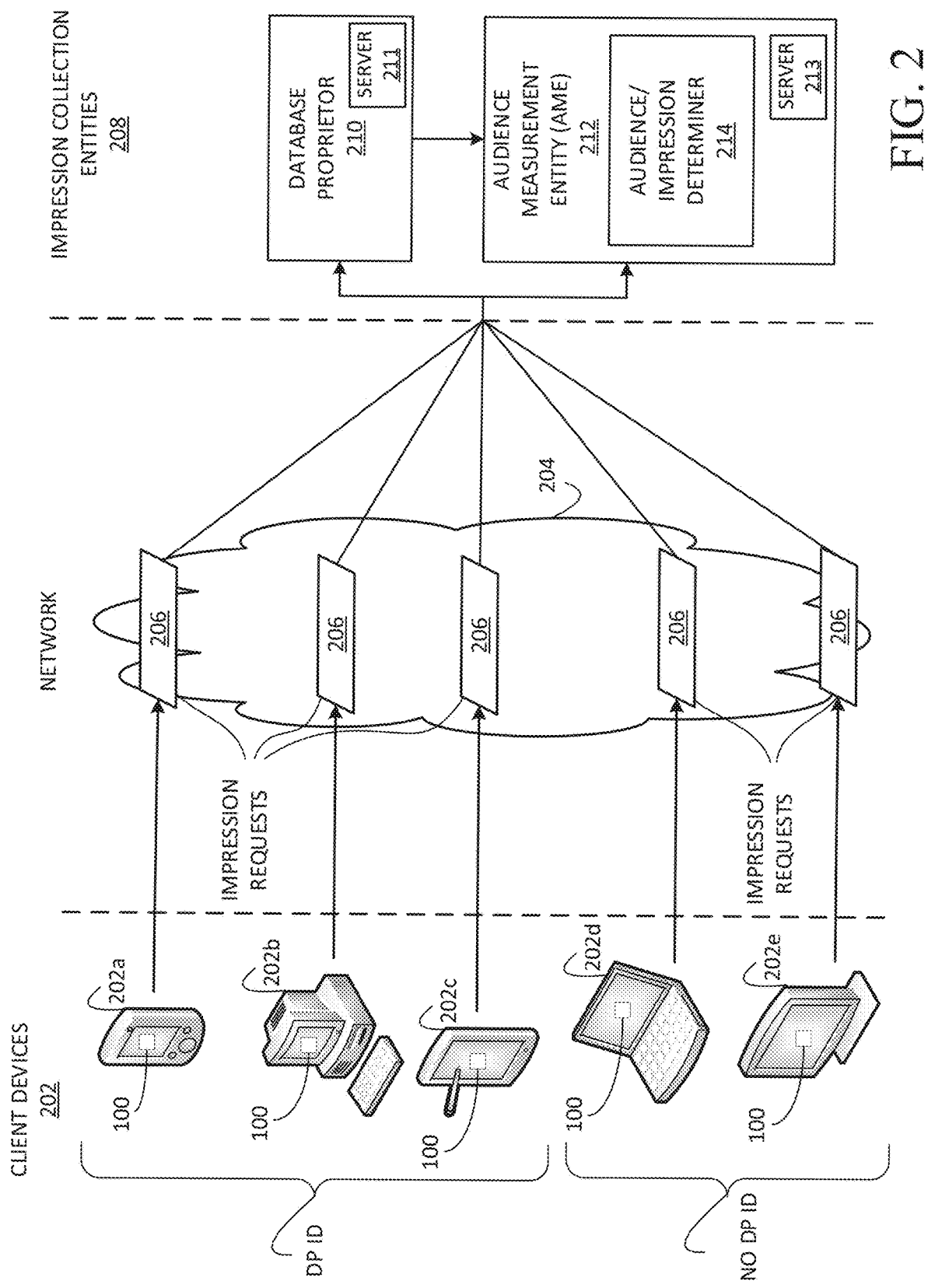
FIG. 2 illustrates example client devices that report audience impression requests for Internet-based media to impression collection entities to facilitate identifying total impression requests and sizes of audiences exposed to different Internet-based media.

FIG. 2 illustrates example client devices 202 that report audience impression requests for Internet-based media (e.g., the media 100 of FIGS. 1A-1C) to impression collection entities 208 to identify a unique audience and/or a frequency distribution for the Internet-based media. The illustrated example of FIG. 2 includes the example client devices 202, an example network 204, example impression requests 206, and the example impression collection entities 208. As used herein, an impression collection entity 208 refers to any entity that collects impression data such as, for example, an example AME 212 and/or an example database proprietor 210. In the illustrated example, the AME 212 includes an example audience/impression determiner 214.

The example client devices 202 of the illustrated example may be any device capable of accessing media over a network (e.g., the example network 204). For example, the client devices 202 may be an example mobile device 202a, an example computer 202b, 202d, an example tablet 202c, an example smart television 202e, and/or any other Internet-capable device or appliance. Examples disclosed herein may be used to collect impression information for any type of media including content and/or advertisements. Media may include advertising and/or content delivered via websites, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s).

The example network 204 is a communications network. The example network 204 allows the example impression requests 206 from the example client devices 202 to the example impression collection entities 208. The example network 204 may be a local area network, a wide area network, the Internet, a cloud, or any other type of communications network.

The impression requests 206 of the illustrated example include information about accesses to media at the corresponding client devices 202 generating the impression requests. Such impression requests 206 allow monitoring entities, such as the impression collection entities 208, to collect a number of media impressions for different media accessed via the client devices 202. By collecting media impressions, the impression collection entities 204 can generate media impression quantities for different media (e.g., different content and/or advertisement campaigns).

The impression collection entities 208 of the illustrated example include the example database proprietor 210 and the example AME 212. In the illustrated example, the example database proprietor 210 may be one of many database proprietors that operate on the Internet to provide services to subscribers. Such services may be email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), and/or any other site that maintains user registration records.

In some examples, execution of the beacon instructions corresponding to the media 100 causes the client devices 202 to send impression requests 206 to servers 211, 213 (e.g., accessible via an Internet protocol (IP) address or uniform resource locator (URL)) of the impression collection entities 208 in the impression requests 206. In some examples, the beacon instructions cause the client devices 202 to locate device and/or users identifiers and media identifiers in the impression requests 206. The device/users identifier may be any identifier used to associate demographic information with a user or users of the client devices 202. Example device/user identifiers include cookies, hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), an Ad ID (e.g., an advertising ID introduced by Apple, Inc. for uniquely identifying mobile devices for purposes of serving advertising to such mobile devices), third-party service identifiers (e.g., advertising service identifiers, device usage analytics service identifiers, demographics collection service identifiers), etc. In some examples, fewer or more device/user identifier(s) 228 may be used. The media identifiers (e.g., embedded identifiers, embedded codes, embedded information, signatures, etc.) enable the impression collection entities 208 can identify to media (e.g., the media 100) objects accessed via the client devices 202. The impression requests 206 of the illustrated example cause the AME 212 and/or the database proprietor 210 to log impressions for the media 100. In the illustrated example, an impression request is a reporting to the AME 202 and/or the database proprietor 210 of an occurrence of the media 100 being presented at the client device 202. The impression requests 206 may be implemented as a hypertext transfer protocol (HTTP) request. However, whereas a transmitted HTTP request identifies a webpage or other resource to be downloaded, the impression requests 206 include audience measurement information (e.g., media identifiers and device/user identifier) as its payload. The server 211, 213 to which the impression requests 206 are directed is programmed to log the audience measurement information of the impression requests 206 as an impression (e.g., a media impression such as advertisement and/or content impressions depending on the nature of the media accessed via the client device 202). In some examples, the server 211, 213 of the database proprietor 201 or the AME 212 may transmit a response based on receiving an impression request 206. However, a response to the impression request 206 is not necessary. It is sufficient for the server 211, 213 to receive the impression request 206 to log an impression request 206.

The example database proprietor 210 maintains user account records corresponding to users registered for services (such as Internet-based services) provided by the database proprietors. That is, in exchange for the provision of services, subscribers register with the database proprietor 210. As part of this registration, the subscribers provide detailed demographic information to the database proprietor 210. Demographic information may include, for example, gender, age, ethnicity, income, home location, education level, occupation, etc. In the illustrated example, the database proprietor 210 sets a device/user identifier on a subscriber's client device 202 that enables the database proprietor 210 to identify the subscriber.

In the illustrated example, the example AME 212 does not provide the media 100 to the client devices 202 and is a trusted (e.g., neutral) third party (e.g., The Nielsen Company, LLC) for providing accurate media access (e.g., exposure) statistics. The example AME 212 includes the example audience/impressions determiner 214. As further disclosed herein, the example audience/impressions determiner 214 provides media access statistics related to the example impression requests 206. In some examples, the audience/impressions determiner 214 calculates a total reach (e.g., a total unique audience) exposed to particular media (e.g., the media 100) based on the example impression requests 206 and data from the example database proprietor 210 (e.g., database proprietor demographic impressions and/or partial audience). Additionally or alternatively, the example audience/impressions determiner 214 calculates a frequency distribution indicative of (1) a total quantity of unique audience members who have not been exposed to a particular media, (2) a total quantity of unique audience members who have been exposed to the particular media exactly once, (3) a total quantity of unique audience members who have been exposed to the particular media exactly twice, etc. Additionally, the example audience/impressions determiner 214 may calculate any statistic related to the example impression requests 206. As disclosed herein, the example audience/impressions determiner 214 determines an optimal UA/FD process (e.g., one of the UA/FD processes 101, 102, 103 of FIGS. 1A-1C) to determine one or more unique audiences corresponding to one or more websites outputting the media and/or other media impression data based on input data and/or operator preferences. The optimal UA/FD process may be determined to optimize usage of resources (e.g., processor resources and/or memory).

In operation, the example client devices 202 employ web browsers and/or applications (e.g., apps) to access media. Some of the web browsers, applications, and/or media include instructions that cause the example client devices 202 to report media monitoring information to one or more of the example impression collection entities 208. That is, when the client device 202 of the illustrated example accesses media, a web browser and/or application of the client device 202 executes instructions in the media, in the web browser, and/or in the application to send the example impression request 206 to one or more of the example impression collection entities 208 via the example network 206. The example impression requests 206 of the illustrated example include information about accesses to the media 100 and/or any other media at the corresponding client devices 202 generating the impression requests 206. Such impression requests allow monitoring entities, such as the example impression collection entities 208, to collect media impressions for different media accessed via the example client devices 202. In this manner, the impression collection entities 208 can generate media impression quantities for different media (e.g., different content and/or advertisement campaigns).

When the example database proprietor 210 receives the example impression request 206 from the example client device 202, the example database proprietor 210 requests the client device 202 to provide a device/user identifier that the database proprietor 210 had previously set for the example client device 202. The example database proprietor 210 uses the device/user identifier corresponding to the example client device 202 to identify the subscriber of the client device 202.

In the illustrated example, three of the client devices 202a, 202b, and 202c have DP IDs (DP device/user IDs) that identify corresponding subscribers of the database proprietor 210. In this manner, when the client devices 202a, 202b, 202c corresponding to subscribers of the example database proprietor 210 send impression requests 206 to the impression collection entities 208, the database proprietor 210 may record database proprietor demographic impressions for the user. In the illustrated example, the client devices 202d, 202e do not have DP IDs. As such, the example database proprietor 210 is unable to identify the client devices 202d, 202e due to those client devices not having DP IDs set by the example database proprietor 210. The client devices 202d, 202e may not have DP IDs set by the database proprietor 210 if, for example, the client devices 202d, 202e do not accept cookies, a user does not have an account with the database proprietor 210 or the user has an account with the database proprietor 210 but has cleared the DP ID (e.g., cleared a cookie cache) and deleted the database proprietor's DP ID before or at the time of a media exposure. In such instances, if the user device 202 is, for example, redirected to contact the database proprietor 210 using the system disclosed in Mainak et al., U.S. Pat. No. 8,370,489, the database proprietor 210 is not able to detect demographics corresponding to the media exposure and, thus, does not report/log any audience or database proprietor demographic impressions for that exposure. In examples disclosed herein, the client devices 202d, 202e are referred to herein as client devices over which the database proprietor 210 has non-coverage because the database proprietor 210 is unable to identify demographics corresponding to those client devices 202d, 202e. As a result of the non-coverage, the database proprietor 210 underestimates the audience size and number of media impressions for corresponding media accessed via the client devices 202 when, for example, operating within the system of Mainak et al., U.S. Pat. No. 8,370,489.

The example AME 212 receives database proprietor demographic impression data from the example database proprietor 210. The database proprietor demographic impression data may include information relating to a total number of the logged database proprietor demographic impressions that correspond with a registered user of the database proprietor 210, a total number of registered users (e.g., a partial audience) that were exposed to media associated with the logged database proprietor demographic impressions, and/or any other information related to the logged database proprietor demographic impressions (e.g., demographics, a total number of registered users exposed to the media 100 more than once, etc.). The example audience/impressions determiner 214 determines a total number of logged media impressions (including but not limited to the number of logged database proprietor demographic impressions from the example database proprietor 210) and a total unique audience based on impression requests 206, survey data, census data, and/or data from a media provider. As further disclosed herein, the example audience/impression determiner 214 determines impression statistics based on the database proprietor demographic impressions associated with the example impression requests 206 and the database proprietor demographic impression data from the example database proprietor 210. The example audience/impression determiner 214 determines a unique audience(s) and/or frequency distribution using at least one of three UA/FD processes the example UA/FD process 1 101, the example UA/FD process 1 102, and the example UA/FD process 3 103 of FIGS. 1A-1C), depending on a desired number of logged impressions per user and a number of websites associated with the logged media impressions.

Figure 3:
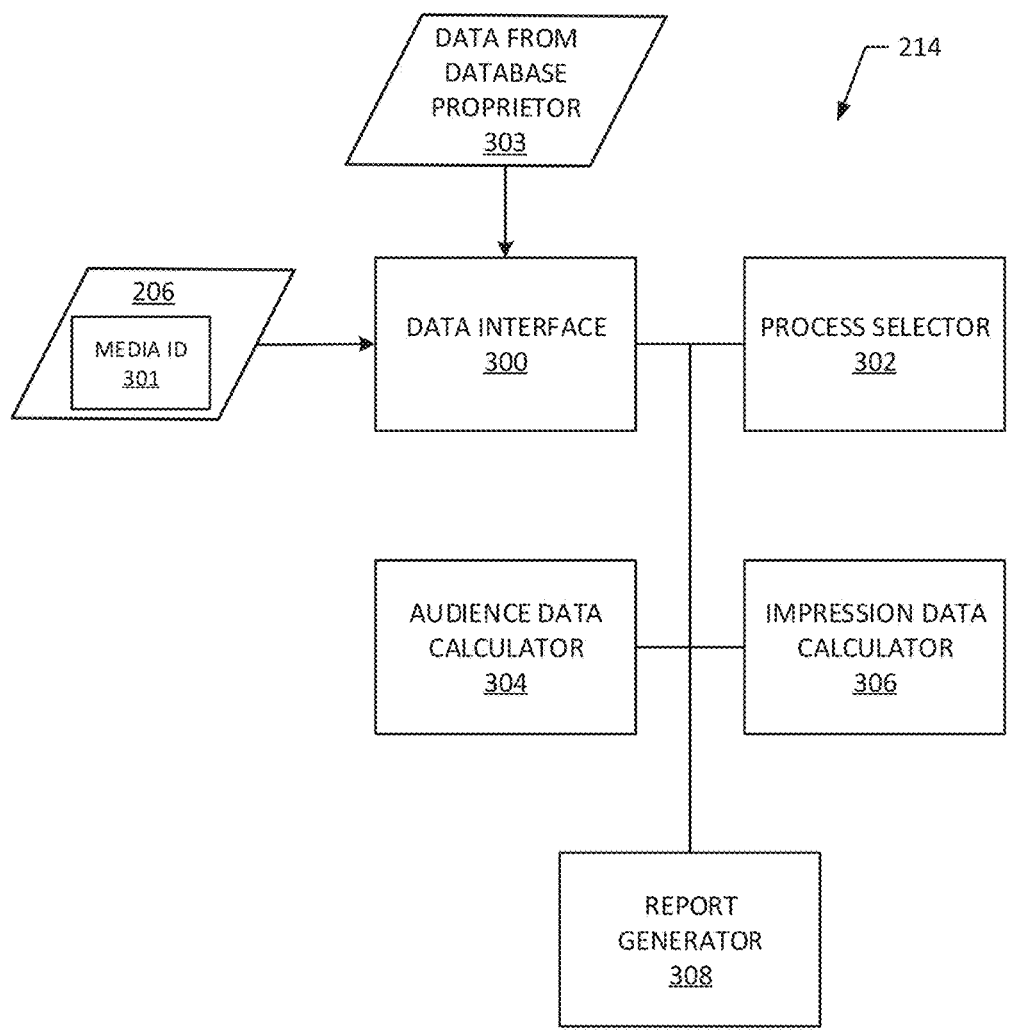
FIG. 3 is a block diagram of the example audience/impression determiner of FIG. 2.

FIG. 3 is a block diagram of the example audience/impression determiner 214 of FIG. 2, disclosed herein, to determine audience measurement data related to the example impression requests 206 (FIG. 2) and the example database proprietor 210 (FIG. 2). While the example audience/impression determiner 214 (FIG. 2) is described in conjunction with the example client devices 202 (FIG. 2) and the example impression collection entities 208 (FIG. 2), the example audience/impression determiner 214 may be utilized to determine impression data based on any type of computing device and/or collection entity. The example audience/impression determiner 214 includes an example data interface 300, an example process selector 302, an example audience data calculator 304, an example impression data calculator 306, and an example report generator 308.

The example data interface 300 receives the example impression requests 206 and data from the example database proprietor 303 (e.g., demographic database proprietor impression data). Initially, the example data interface 300 receives an impression request 206 to log an impression. The impression request 206 of the illustrated example includes a media identifier (ID) 301 to identify the example media 100. The media ID 301 is used to monitor impressions of media 100 and aggregate database proprietor impression data (e.g., database proprietor demographic impressions and/or a partial audience) associated with the media 100.

The example process selector 302 processes the received database proprietor demographic impression data from the example database proprietor 303 to select an optimal UA/FD process (e.g., one of the example UA/FA processes 101, 102, 103 of FIGS. 1A-1C) and/or a frequency distribution for determining a total unique audience and/or a frequency distribution for the example media 100. In some examples, the database proprietor demographic impression data may include data describing demographics of client device users (e.g., total unique 18-25 year old males exposed to the media 100). Additionally, the database proprietor demographic impression data may include (1) how many client device users were exposed to the media 100 exactly once, exactly twice, etc., (2) how many client device users were exposed to the media 100 from a first website, a second website, etc. (3) and/or more complex combinations of media exposure (e.g., how many high income males were exposed to the media impression exactly three times from both website "A" and website "B"). In some examples, the example process selector 302 selects a UA/FD process based on the number of inputs (e.g., the number of websites) and/or the complexity and/or accuracy of a desired output. For example, the example UA/FD process 101 is optimal (e.g., optimizing use of the example processor resources 104 and/or the example memory resources 105 of FIG. 1A) to determine a total unique audience based on media impressions from one website (e.g., the example website 106 of FIG. 1A) due to its relatively low use of the processor resources 104 and the memory resources 105, whereas the UA/FD process 101 may be least optimal or insufficient to determine a total unique audience based on media impressions for the media 100 accessed via the multiple websites (e.g., the websites 108, 109) since the UA/FD process 101 cannot determine unique audiences and frequency distributions for more than one website. In some examples, the process selector 302 may estimate the amount of the example processor resources 104 and/or the amount of example memory resources 105 required to perform each of the example UA/FD processes based on the given inputs (e.g., number of websites, number of impressions per person). In such examples, the process selector 302 may assign different weights to the example processor resources 104 and/or the example memory resources 105 required by each UA/FD process to determine the optimal UA/FD process. The weights may be based on user and/or manufacturer preferences. For example, if a system has limited memory resources (e.g., such as the memory resources 105 of FIGS. 1A-1C), the user may adjust the weights so that the UA/FD processes that require less memory resources are optimal.

The example audience data calculator 304 calculates a unique audience based on the received database proprietor demographic impression data 303 and the selected UA/FD process. In some examples, the audience data calculator 304 inputs data related to the logged media impressions and/or the aggregate database proprietor impression data into a formula to calculate the unique audience. In some examples, the audience data calculator 304 creates a population model constraint matrix (e.g., the example constraint matrix 825 of FIG. 8C) and a population total constraint vector (e.g., the example population constraint vector 827 of FIG. 8C) to calculate the unique audience. In some examples, the audience data calculator 304 solves various non-linear systems of equations to calculate the unique audience(s). The calculation of the unique audience and/or various statistics is further described in FIGS. 5-7.

The example impression data calculator 306 calculates a frequency distribution based on the received data 303 and the selected UA/FD process. In some examples, the impression data calculator 306 inputs data related to the logged media impressions and/or the aggregate database proprietor impression data into a formula to calculate the frequency distribution. In some examples, the impression data calculator 306 creates an audience/impressions model constraint matrix ($C_Q$) and an audience/impressions total constraint vector ($D_Q$) to calculate the frequency distribution as described above in connection with Equation 6. In some examples, the impression data calculator 306 solves various non-linear systems of equations (e.g., as described above in connection with Equations 8 and 9) to calculate the frequency distribution. The calculation of the frequency distribution and/or various statistics is further described below in connection with FIGS. 5-7.

The example report generator 308 generates reports based on the various statistics calculated by the example audience data calculator 304 and the example impression data calculator 306. In some examples, the report generated by the example report generator 308 includes a unique audience(s) and/or a frequency distribution. In some examples, the report generated by the example report generator 308 includes demographic data (e.g., a unique audience and/or frequency distribution for a particular demographic). In some examples, the report generator 308 includes data for the one or more websites that are associated with an impression associated with the example media 100. In some examples, the report generator 308 includes data in reports that describe how many people within the unique audience were exposed to the media 100 exactly once, twice, etc. In some examples, the report generator 308 combines data from logged impressions of the media 100 and/or other media associated with a particular company. For example, the report generated by the example report generator 308 may combine data indicating a total audience for three distinct advertisements for a particular company. Such reports may include data indicating how many people saw at least one of the three advertisements, how many people saw two of the three advertisements from website A or B, how many people saw the first two advertisements, but missed the last advertisement, etc. In some examples, the report generator 308 credits media associated with logged impressions based on the unique audience and/or frequency distribution.

While example manners of implementing the example audience/impressions determiner 214 of FIG. 2 are illustrated in FIG. 3, elements, processes and/or devices illustrated in FIG. 3 may be combined, divided, re-arranged, omitted, eliminated and/or implemented in any other way. Further, the example data interface 300, the example process selector 302, the example audience data calculator 304, the impression data calculator 306, the example report generator 308, and/or, more generally, the example audience/impressions determiner 214 of FIG. 3 may be implemented by hardware, machine readable instructions, software, firmware and/or any combination of hardware, machine readable instructions, software and/or firmware. Thus, for example, any of the example data interface 300, the example process selector 302, the example audience data calculator 304, the impression data calculator 306, the example report generator 308, and/or, more generally, the example audience/impressions determiner 214 of FIG. 3 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 300, the example process selector 302, the example audience data calculator 304, the impression data calculator 306, the example report generator 308, and/or, more generally, the example audience/impressions determiner 214 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example audience/impression determiner 214 of FIG. 3 include elements, processes and/or devices in addition to, or instead of, those illustrated in FIGS. 4-7, and/or may include more than one of any or all of the illustrated elements, processes and devices.

Figure 4:
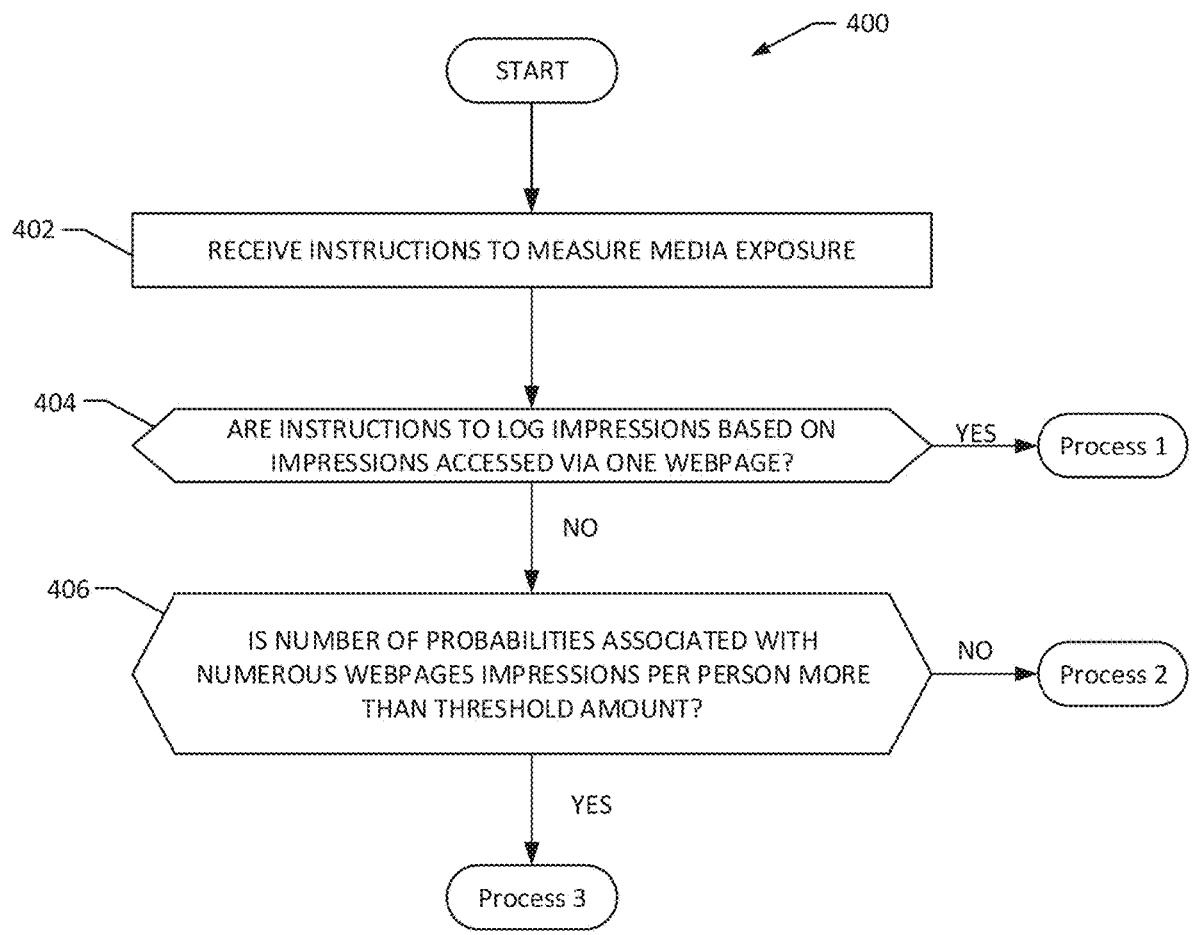
FIGS. 4-7 are flowcharts representative of example machine readable instructions that may be executed to implement the audience/impression determiner of FIG. 2 and/or FIG. 3 to determine the unique audience for particular media based on impressions and/or the frequency distribution of the impressions.

Flowcharts representative of example machine readable instructions for implementing the example audience/impression determiner 214 of FIG. 3 are shown in FIGS. 4-7. In the examples, the machine readable instructions comprise a program for execution by a processor such as the processor 1012 shown in the example processor platform 1000 discussed below in connection with FIG. 10. The program may be embodied in machine readable instructions stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 4-7, many other methods of implementing the example audience/impression determiner 214 of FIG. 3 may alternatively be used. For example, the order of execution of the blocks may be changed, and/or some of the blocks described may be changed, eliminated, or combined. Although the flowchart of FIG. 4 depicts example operations in an illustrated order, these operations are not exhaustive and are not limited to the illustrated order. In addition, various changes and modifications may be made by one skilled in the art within the spirit and scope of the disclosure. For example, blocks illustrated in the flowchart may be performed in an alternative order or may be performed in parallel.

As mentioned above, the example processes of FIGS. 4-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. In addition, the term "including" is open-ended in the same manner as the term "comprising" is open-ended.

The example machine readable instructions 400 illustrated in FIG. 4 may be executed to implement the audience/impressions determiner 214 of FIGS. 2 and 3 to select a UA/FD process (e.g., the UA/FD processes 101, 102, 103 of FIGS. 1A-1C) that optimizes the example processor resources 104 and/or the example memory resources 105 of FIG. 1 for use in determining unique audience(s) and/or frequency distribution of the unique audience based on logged impressions corresponding to the media 100 (FIGS. 1A-1C and 2).

Initially, at block 402 of FIG. 4, the example data interface 300 (FIG. 3) receives instructions to measure media exposure corresponding to the media 100 of FIG. 1. For example, a company corresponding to the media 100 may request the AME 212 (FIG. 2) to measure media exposure for the media 100 accessed via one website (e.g., the website 106 of FIG. 1A). Alternatively, the company may request the AME 212 to measure media exposure for the media 100 accessed via two or more websites (e.g., the example websites 108, 109 of FIGS. 1B-1C). In some examples, the instructions include a total number of logged media impressions and/or a total universe audience size.

At block 404 of FIG. 4, the example process selector 302 (FIG. 3) determines if the instructions of block 402 to measure media exposure are for media impressions accessed via one website. For example, the instructions may request a total unique audience for the media 100 based on media impressions accessed via only one website (e.g., the example website 106). If the example processor selector 302 determines that the instructions of block 402 are to measure media exposure based on media impressions accessed via one website, the example process selector 302 selects the example UA/FD process 1 101 of FIG. 1.

If the example processor selector 302 determines that the instructions of blocks 402 are not for measuring media exposure based on media impressions accessed via one website (e.g., the request is based on the logged impressions from the example two or more websites 108, 109), the example selector 302 determines if the number of probabilities associated with the numerous websites and impressions per person is more than a threshold amount (block 406). For example, as described above, as the number of websites and/or impressions per person increases, the amount of possible probabilities to solve and store increases. In some examples, a computer to execute the selected UA/FD process does not have enough of the required example memory resources 105 to store all of the possible probabilities associated with the websites and/or impressions. Since a person can view the media 100 a large number of times, the number of possible probabilities becomes nearly infinite. Thus, the example UA/FD process 2 102 (FIGS. 1A-1C) usually limits the number of impressions per person in order to determine a unique audience based on the limited number of impressions per person. The number of probabilities is equivalent to the number of impressions per person to the power of the number of websites. For example, if the request to log impressions is based on the media 100 from two websites the example websites 108, 109) where the most a client device can report an impression associated with the media 100 (e.g., be exposed to the media) is five times, then the number of probabilities is twenty-five (e.g., $5^2=25$) due to the capacity of mathematics associated with the UA/FD process modeling.

If the number of probabilities is not more than the threshold amount at block 406, then the example process selector 302 selects the example UA/FD process 2 102 (FIGS. 1A-1C). If the number of probabilities is more than the threshold amount, the example process selector 302 selects the example UA/FD process 3 103 (FIGS. 1A-1C). The threshold amount may be based on AME manufacturer settings. For example, in systems that have limited memory resources, the example AME 212 of FIG. 2 may select a smaller threshold amount for block 406 for a system with a large amount of memory resources. In some examples, the amount of example processor resources 104 and/or the amount of the example memory resources 105 are weighted to determine the threshold amount.

Figure 5A:
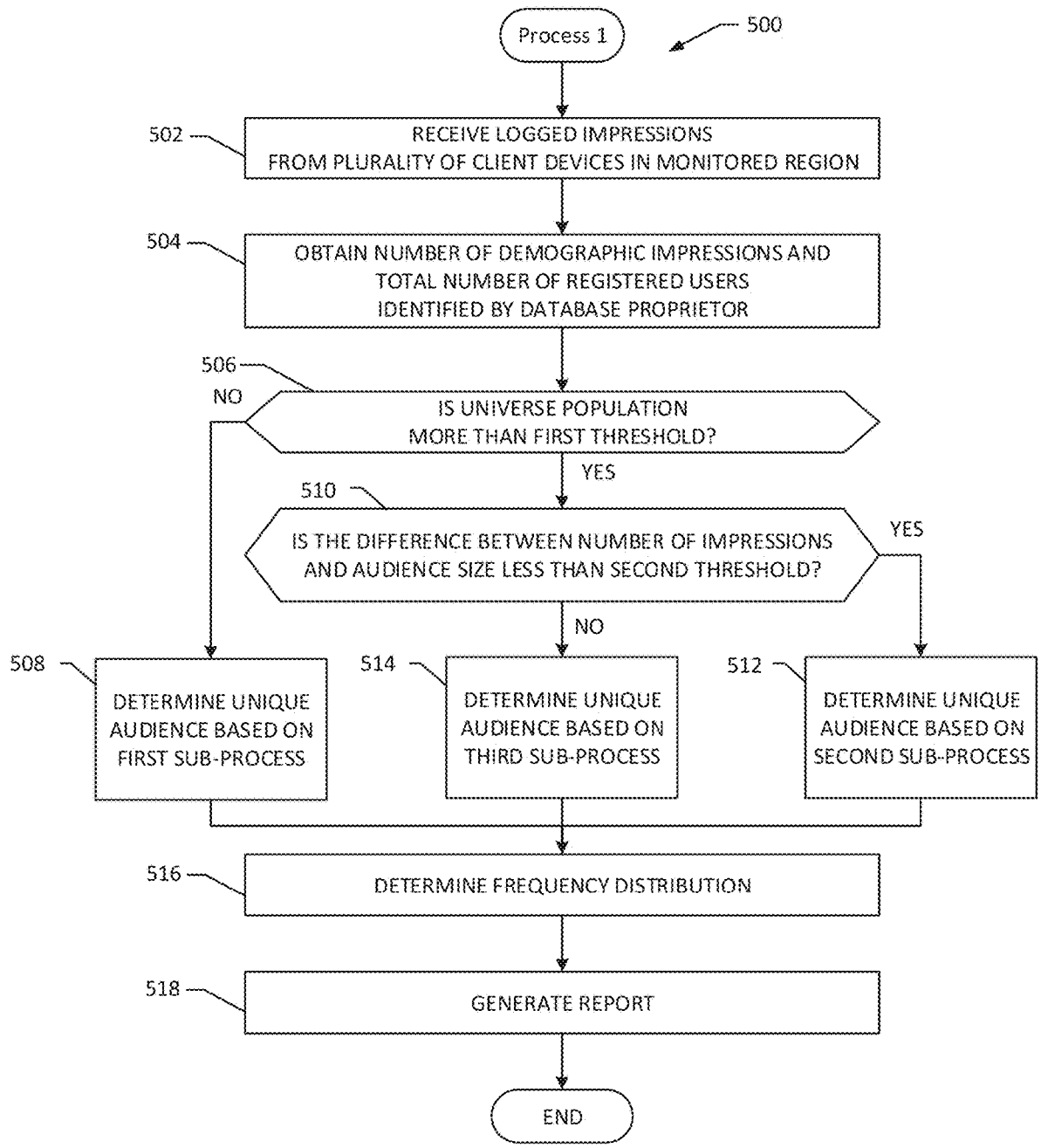

Turning now to FIG. 5A, the example machine readable instructions illustrated in FIG. 5A may be executed to cause the audience/impressions determiner 214 of FIG. 3 to determine a total unique audience and frequency distribution using the example UA/FD process 1 101.

FIG. 5A is an example flowchart 500 representative of example machine readable instructions that may be executed to implement the example audience/impressions determiner 214 of FIGS. 2 and 3 to determine a total unique audience (X) and a frequency distribution of the unique audience based on the impressions of the example media 100 using the example UA/FD process 1 101 (FIG. 1A).

At block 502 of FIG. 5A, the example data interface 300 receives logged impressions from a plurality of the client devices 202 in a monitored or measured region. For example, there may be 1,000 total logged impressions (T) associated with the media 100 from a population of 50,000 people in a monitored region (e.g., a universe) (U). For example, the universe is a monitored region such as a state, a country, a continent, the world, etc. In some examples, the data interface 300 receives impression requests at the server 213 (FIG. 2) of the AME 212 (FIG. 2) from the client devices 202 (FIG. 2) via the network 204 (FIG. 2). In such examples, the server 213 logs the impressions corresponding to the example media 100 (FIG. 2) and determines a quantity of unique people identified by the example database proprietor 210 (e.g., a partial audience corresponding to registered database proprietor users) associated with the media 100 using the example server 213. As described above, not everyone in the universe population viewed the media 100 and some of the 1,000 total logged impressions were presented to the same client device 202. Because at least one person in the universe population may have viewed the media 100 more than once, the total number of the logged impressions usually is not representative of a unique audience of the media 100. As described above, the example UA/FD process 1 101 is based on an equation derived from the principles of maximum entropy and minimum cross entropy. The equation can be simplified (e.g., in order to use less of the example processor resources 104) based on the sizes of the universe population, the number of the logged impressions corresponding the database proprietor 210 (e.g., database proprietor demographic impressions), the unique audience registered to the database proprietor 210 associated with the logged impressions, and/or the total number of the logged impressions (e.g., media impressions).

At block 504 of FIG. 5A, the example data interface 300 (FIG. 3) obtains a number of logged demographic database proprietor impressions and a total number of registered users identified by the database proprietor 210 (FIG. 2). In the illustrated example, for the monitored media 100, the database proprietor 210 may identify a count of 600 logged impressions (R) that correspond to a count of 200 unique people (A) that are registered users of the database proprietor 210.

At block 506 of FIG. 5A, the example audience data calculator 304 (FIG. 3) determines if the universe population is more than a first threshold size. The first threshold size may be based on a user and/or manufacturer preference. For example, the threshold size may be based on a desired precision of the results (e.g., the higher the threshold the more precise the results). If the universe population is not more than the first threshold size at block 506, then the audience data calculator 304 determines a unique audience for the media 100 (e.g., the advertisement) based on an example first unique audience sub-process (e.g., herein referred to as unique audience sub-process 1.1) (block 508). The example unique audience sub-process 1.1 is represented as $$\frac{(R-A)(U-A)}{A^2} = \frac{(T-X)(U-X)}{X^2}.$$

An example manner of implementing the example unique audience sub-process 1.1 is described below in connection with FIG. 5B. Using unique audience sub-process 1.1, the audience data calculator 304 determines the unique audience (X) to be 270 people $$\left(e.g., \frac{(600-200)(50000-200)}{200^2} = \frac{(1000-X)(50000-X)}{X^2}\right).$$

If the universe population is more than the first threshold, unique audience sub-process 1.1 can be simplified. That is, when the universe is sufficiently large the unique audience sub-process 1.1 is simplified by taking the limit of the unique audience sub-process 1.1 as U goes to infinity, as further described below.

If the example audience data calculator 304 determines at block 506 that the universe population is more than the threshold size, control advances to block 510. At block 510, the example audience data calculator 304 determines if there is a difference between the number of logged impressions and audience size less than a second threshold. The second threshold size may be based on a user and/or manufacturer preference. For example, the threshold size may be based on a desired precision of the results (e.g., the higher the threshold the more precise the results). If at block 510 the difference between the number of logged impressions (R and T) and the audience sizes (A and X) is less than the second threshold, the example audience data calculator 304 determines a unique audience (X) based on an example second unique audience sub-process (e.g., herein referred to as unique audience sub-process 1.2) (block 512). An example manner of implementing the example unique audience sub-process 1.2 is described below in connection with FIG. 5C. The example, unique audience sub-process 1.2 is represented as $$\frac{A^2}{R-A} = \frac{X^2}{T-X}.$$

Unique audience sub-process 1.2 is based on a mathematical rearrangement of unique audience sub-process 1.1 since the universe population is large $$\left(e.g., \lim_{U\to\infty} \frac{(R-A)(U-A)}{A^2} = \frac{(T-X)(U-X)}{X^2} \xrightarrow{yields} \frac{(R-A)}{A^2} = \frac{(T-X)}{X^2} \text{ or } \frac{A^2}{R-A} = \frac{X^2}{T-X}\right).$$

Using the unique audience sub-process 1.2, the audience data calculator 304 determines the unique audience (X) to be 270

$$\left(e.g., \frac{200^2}{600-200} = \frac{X^2}{1000-X}\right).$$

If at block 510 the difference between the number of logged impressions (R and T) and the audience sizes (A and X) is not less than the second threshold, the example audience data calculator 304 determines a unique audience (X) based on a third unique audience sub-process (e.g., herein referred to as unique audience sub-process 1.3) (block 514). An example manner of implementing the example unique audience sub-process 1.3 is described below in connection with FIG. 5D. The example unique audience sub-process 1.3 is represented as $$\frac{A^2}{R} = \frac{X^2}{T}.$$

Unique audience sub-process 1.3 is based on a mathematical rearrangement of unique audience sub-process 1.2 since the difference between the logged impressions and the audience size is large $$\text{(e.g., } \frac{A^2}{R-A} = \frac{X^2}{T-X} \xrightarrow{yields} \frac{A^2}{R} = \frac{X^2}{T}$$

when R>>A and T>>X). Using unique audience sub-process 1.3, the audience data calculator 304 determines the unique audience (X) to be 258

$$\left(\text{e.g., } \frac{200^2}{600} = \frac{X^2}{1000}\right).$$

At block 516 of FIG. 5A, the example impression data calculator 306 (FIG. 3) determines the frequency distribution. The frequency distribution is the number of people in the unique audience who were exposed to an impression exactly once, twice, etc. (e.g., the number of people exposed to the media 100 once, the number of people exposed to the media 100 twice, etc.). The example impression data calculator 306 determines the frequency distribution based on a geometric distribution formula as shown below in Equations 10 and 11.

$$P(Z = k) = (1-p)^{k-1} p, \quad \text{Equation 10}$$

$$p = \frac{X}{T}, \quad \text{Equation 11}$$

where k∈{1, 2, . . . , ∞}

In Equations 10 and 11 above, k is the number of impressions per person. Using the above example (e.g., X=270 and T=1000), the example impression data calculator 306 determines that 27% of the unique audience (e.g., 27%×270=72.9 people) were exposed to the example media 100 once. Thus, each of those 72.9 users is associated with only one corresponding logged impression, (e.g., $((1-0.27)^{1-1})*0.27=0.27$), and 19.7% of the unique audience (e.g., 19%×270=51.3 people) was exposed to the example media 100 twice. Thus, each of those 51.3 users is associated with two corresponding logged impressions (e.g., $((1-0.27)^{2-1})*0.27=0.197$), etc.

At block 518 of FIG. 5A, the example report generator 308 (FIG. 3) generates a report of the unique audience and/or the frequency distribution. As described above, the report may include any data related to the aggregate database proprietor impression data, the website, demographic data, and/or the logged impressions. In some examples, the report generator 308 credits the media 100 associated with the logged impressions based on the unique audience and/or the frequency distribution.

Figure 5B:
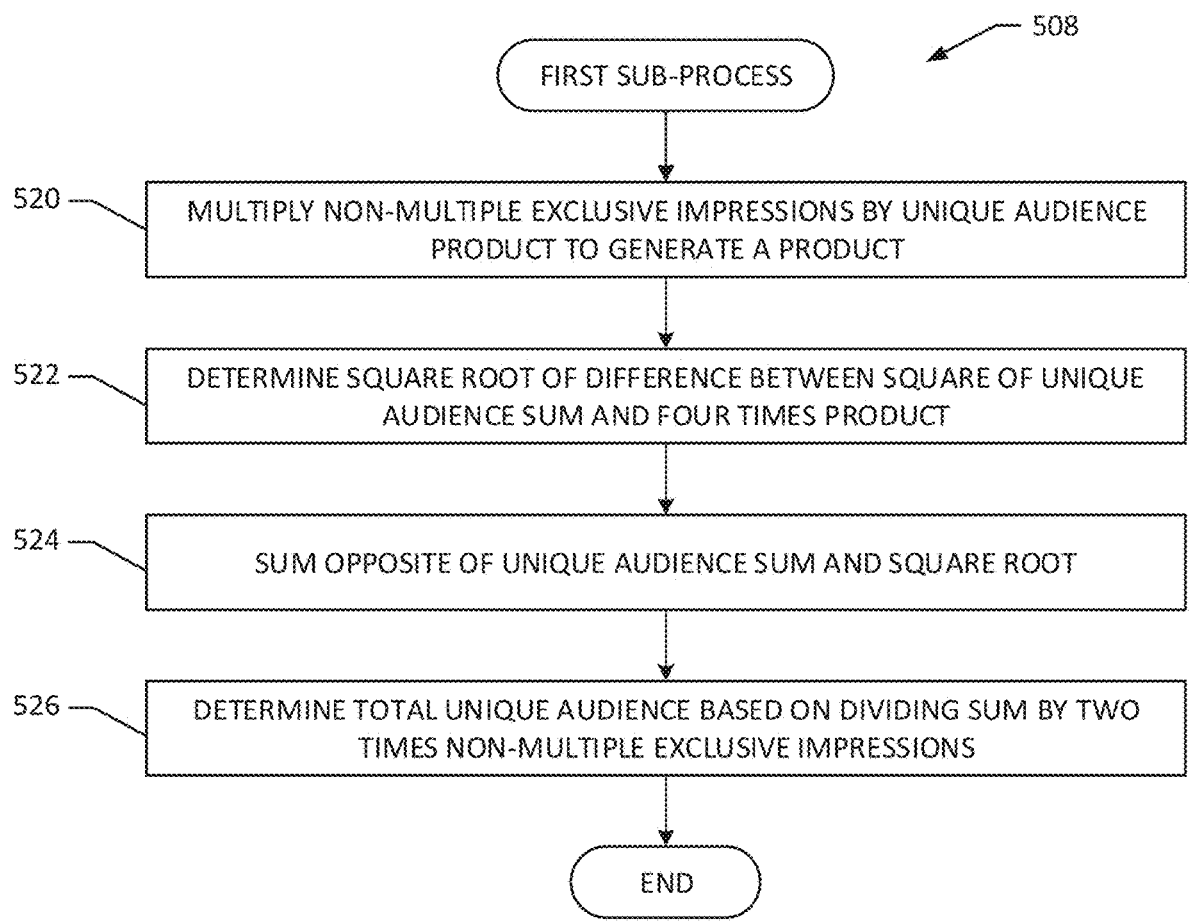

Turning now to FIG. 5B the example machine readable instructions represented by the flowchart of FIG. 5B may be executed to cause the audience/impressions determiner 214 of FIG. 3 to determine a total unique audience (X) using the unique audience sub-process 1.1 represented by Equation 12 below.

$$\frac{(R-A)(U-A)}{A^2} = \frac{(T-X)(U-X)}{X^2}), \quad \text{Equation 12}$$

The example instructions represented by the flowchart of FIG. 5B may be used to implement as shown in block 508 of FIG. 5A. The example audience data calculator 304 (FIG. 3) determines the total unique audience (X) by solving the quadratic function corresponding to the example unique audience sub-process 1.1 (e.g., $(AR+AU-RU)X^2+(A^2(-T)-A^2U)X+A^2TU=0$). In the illustrated example of the unique audience sub-process 1.1, the expression AR+AU−RU represents non-mutually exclusive impressions, the expression $A^2(-T)-A^2U$ represents a unique audience sum, and the expression $A^2TU$ represents a unique audience product.

At block 520 of FIG. 5B, the example audience data calculator 304 (FIG. 3) multiplies the non-mutually exclusive impressions by the unique audience product to generate a product (e.g., $(AR+AU-RU)(A^2TU)$). At block 522, the example audience data calculator 304 determines a square root of a difference between a square of the unique audience sum and four times the product generated at block 520 (e.g., $\sqrt{(A^2(-T)-A^2U)^2-4(AR+AU-RU)(A^2TU)}$). At block 524, the example audience data calculator 304 sums an opposite of the unique audience sum and the square root determined at block 522 (e.g., $-(A_2(-T)-A^2U)^2+\sqrt{(A^2(-T)-A^2U)^2-4(AR+AU-RU)(A^2TU)}$). At block 526, the example audience data calculator 304 determines a total unique audience (X) based on dividing the sum at block 524 by two times the non-multiple exclusive impressions, as show in equation 13 below.

$$X = \frac{-(A^2(-T)-A^2U)^2 + \sqrt{(A^2(-T)-A^2U)^2 - 4(AR+AU-RU)(A^2TU)}}{2(AR+AU-RU)}), \quad \text{Equation 13}$$

Figure 5C:
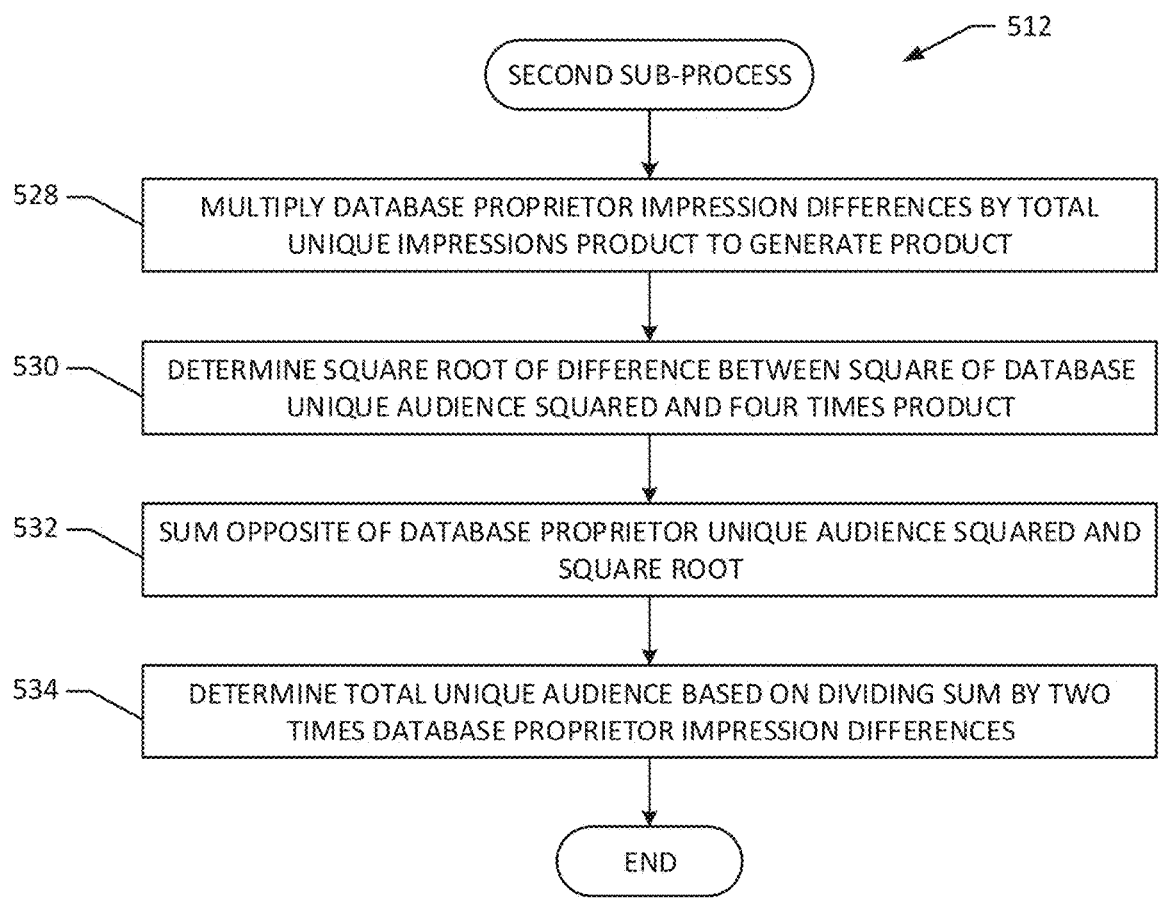

Turning now to FIG. 5C, the example machine readable instructions represented by the flowchart of in FIG. 5C may be executed to cause the audience/impressions determiner 214 of FIG. 3 to determine a total unique audience (X) using the example unique audience sub-process 1.2 represented by Equation 14

$$\frac{A^2}{R-A} = \frac{X^2}{T-X}, \quad \text{Equation 14}$$

The example instructions of FIG. 5B may be used to implement block 512 of FIG. 5A. The example audience data calculator 304 (FIG. 3) determines the total unique audience (X) by solving the quadratic function corresponding to the example unique audience sub-process 1.2 (e.g., $(R-A)X^2+A^2X-A^2T=0$). In the illustrated example of the unique audience sub-process 1.2, the expression R−A represents database proprietor impression difference, the expression $A^2$ represents a database proprietor unique audience squared, and the expression $A^2T$ represents a total unique audience product.

At block 528 of FIG. 5C, the example audience data calculator 304 (FIG. 3) multiplies the database proprietor impression difference by the total unique audience product to generate a product (e.g., $(R-A)(A^2T)$). At block 530, the example audience data calculator 304 determines a square root of a difference between a square of the database proprietor unique audience squared and four times the product generated at block 528 (e.g., $\sqrt{(A^2)^2-4(R-A)(A^2T)}$). At block 532, the example audience data calculator 304 sums an opposite of the database proprietor unique audience squared and the square root determined at block 530 (e.g., $-A^2+\sqrt{(A^2)^2-4(R-A)(A^2T)}$). At block 534, the example audience data calculator 304 determines the total unique audience (X) based on dividing the sum at determined block 532 by two times the database proprietor impression difference, as shown in Equation 15 below, $$X = \frac{-A^2 + \sqrt{(A^2)^2 - 4(R-A)(A^2T)}}{2(R-A)}, \quad \text{Equation 15}$$

Figure 5D:
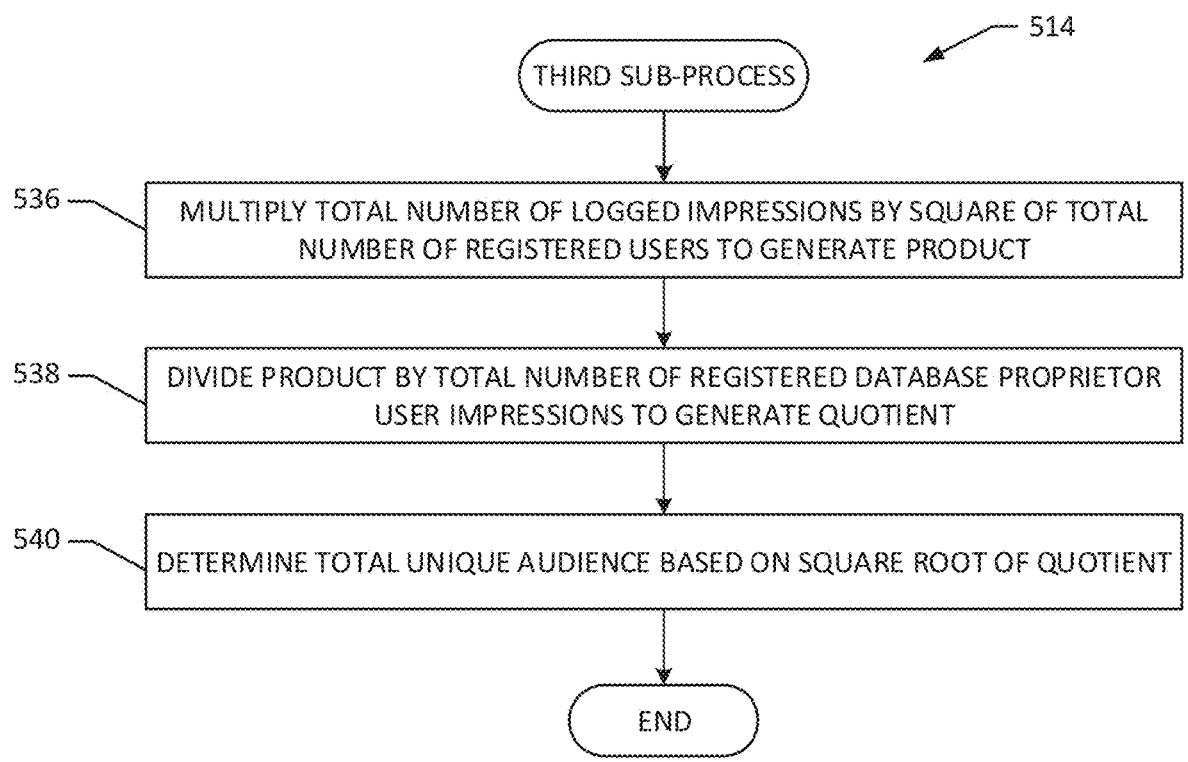

Turning now to FIG. 5D, the example machine readable instructions represented by the flowchart of FIG. 5D may be executed to cause the audience/impressions determiner 214 of FIG. 3 to determine a total unique audience (X) by solving the example unique audience sub-process 1.3 represented by Equation 16 below.

$$\frac{A^2}{R} = \frac{X^2}{T}, \quad \text{Equation 16}$$

The example instructions of FIG. 5B may be used to implement block 514 of FIG. 5A.

At block 536 of FIG. 5D, the example audience data calculator 304 (FIG. 3) multiplies the total number of logged impressions (T) by a square of a total number of registered database proprietor users (A) to generate a product (e.g., $TA^2$). In block 538, the example audience data calculator 304 divides product by the total number of registered database proprietor user impressions (R) to generate a quotient $$\left(\text{e.g., } \frac{TA^2}{R}\right).$$

At block 540, the audience data calculator 304 determines a total unique audience (X) based on a square root of the quotient. As shown in Equation 17 below.

$$X = \sqrt{\frac{TA^2}{R}}, \quad \text{Equation 17}$$

Figure 6:
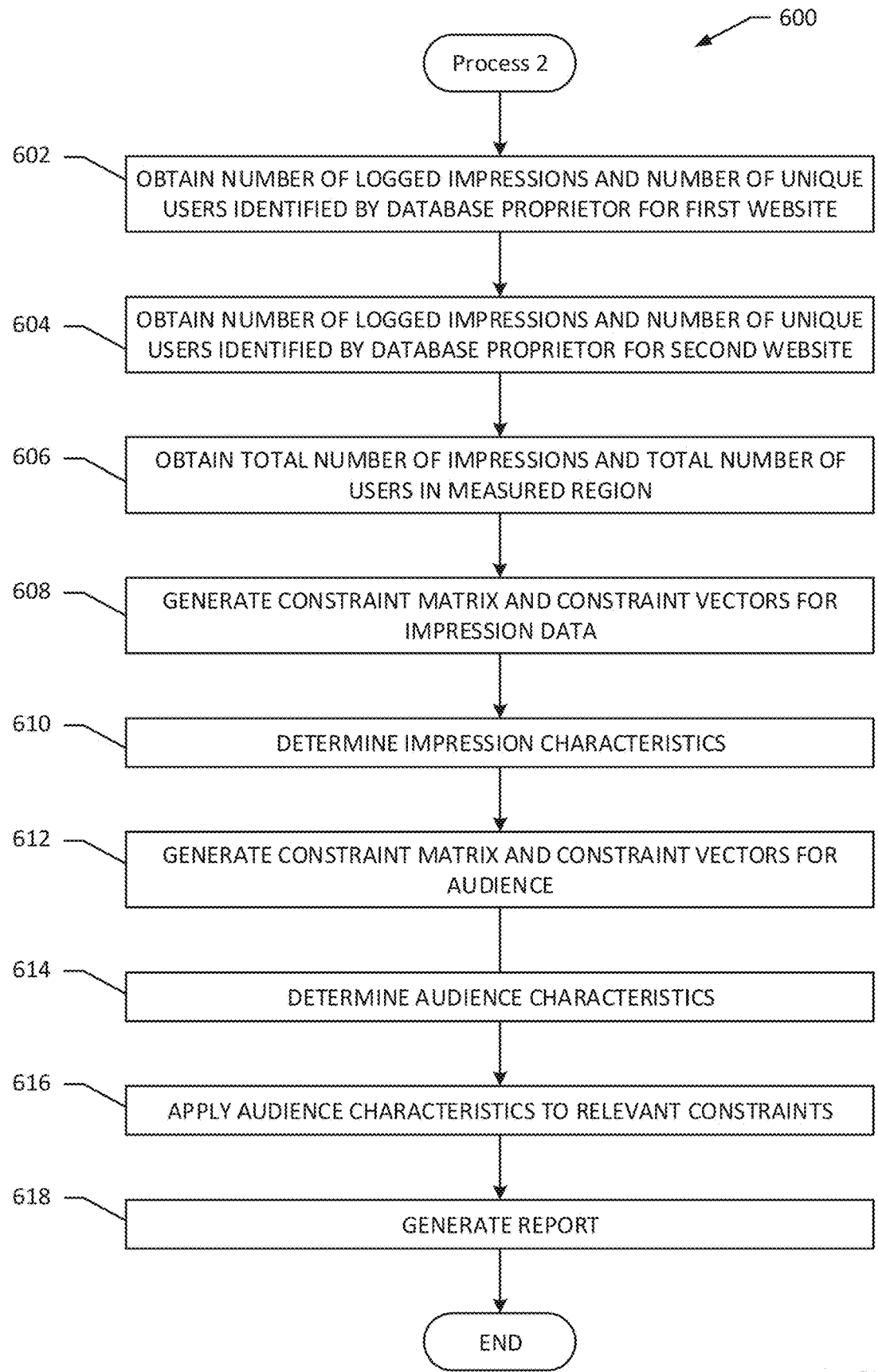

FIG. 6 is an example flowchart 600 representative of example machine readable instructions that may be executed to implement the example audience/impressions determiner 214 of FIGS. 2 and 3 to determine a unique audience for the example media 100 associated with two websites (e.g., the example websites 108 of FIG. 1B) and a frequency distribution of the unique audience(s) based on logged impressions of the example media 100 using the example UA/FD process 2 102 (FIG. 1A-1C). The example flowchart 600 is described in conjunction with an example shown in FIGS. 8A-8D. FIGS. 8A-8D represent logged impressions associated with the media 100 accessed via two websites 108 where each user may be exposed to the example media 100 no more than twice per website 108. As shown in FIGS. 8A-8D, the unique audience for website A is herein referred to as "X1," the unique audience for website B is herein referred to as "X2," and the total unique audience is herein referred to as "X." Although the example flowchart 600 is described in conjunction with an example of a two websites 108 with, at most, two impressions per person, any number of websites and or logged impressions may be used.

At block 602 of FIG. 6, the example data interface 300 (FIG. 3) obtains a number of the logged impressions (e.g., database proprietor demographic impressions) and a number of unique users identified by the example database proprietor 210 (e.g., a partial audience corresponding to registered database proprietor users) in connection with accesses to the media 100 via a first website (e.g., Website A). In an illustrated example table 800 of FIG. 8A, the example data interface 300 receives a count of 200 logged impressions that correspond to 150 unique users (e.g., the audience) that accessed the media 100 via website A and that are registered users of a database proprietor (e.g., the website A partial audience corresponding to registered database proprietor users).

At block 604 of FIG. 6, the example data interface 300 obtains a number of logged impressions (e.g., database proprietor demographic impressions) and a number of unique people (e.g., a partial audience) identified by the example database proprietor 210 as accessing the media 100 via a second website (e.g., Website B). As described above in connection with FIG. 2, the database proprietor 210 that logged impressions for website B may or may not be the same as the database proprietor that logged impressions for website A. In the illustrated example table 800 of FIG. 8A, the example data interface 300 obtains a count of 300 logged impressions that correspond to 175 unique people that accessed the media 100 via website B and that are registered users of the database (e.g., the website B partial audience corresponding to registered database proprietor users).

At block 606 of FIG. 6, the example data interface 300 obtains a total number of logged impressions (e.g., media impressions) corresponding to the example client devices 202 and a total number of client device 202 in a monitored region (e.g., a universe). In some examples, the impressions are logged at the server 213 (FIG. 2) based on the impression requests 206 sent by the client devices 202 (FIG. 2) via the network 204. In some examples, the data interface 300 logs the media impressions corresponding to the media 100 (FIG. 2) accessed at the client devices 202 (FIG. 2). In some examples, the example data interface 300 obtains a total number of the logged impressions associated with accesses to the media 100 via website A and a total number of logged impressions associated with accesses to the media 100 via website B. In the illustrated example table 800 of FIG. 8A, there are a count of 300 logged impressions associated with website A, a count of 500 logged impressions associated with website B, and a count of 800 total logged impressions. Additionally, the universe population in the illustrated example is 1,000 users (not shown).

Figure 8A:
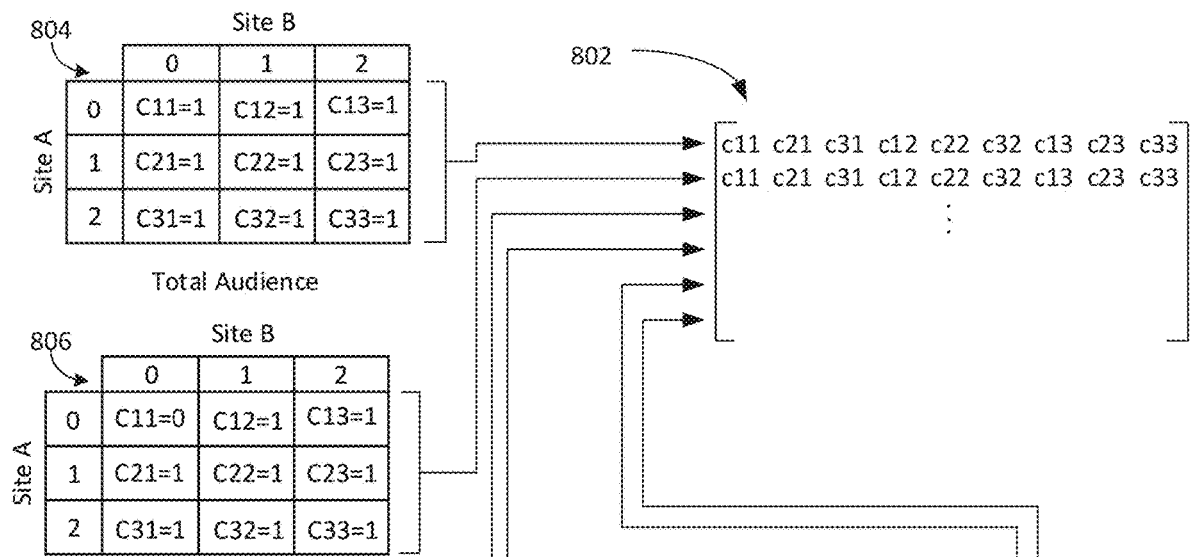
FIGS. 8A-8D illustrate example data associated with a second process of the example processes of FIGS. 1A-1C used by the example audience data calculator and/or the example impression data calculator of FIG. 3 to determine the unique audience and the frequency distribution of the impressions.
Figure 8B:
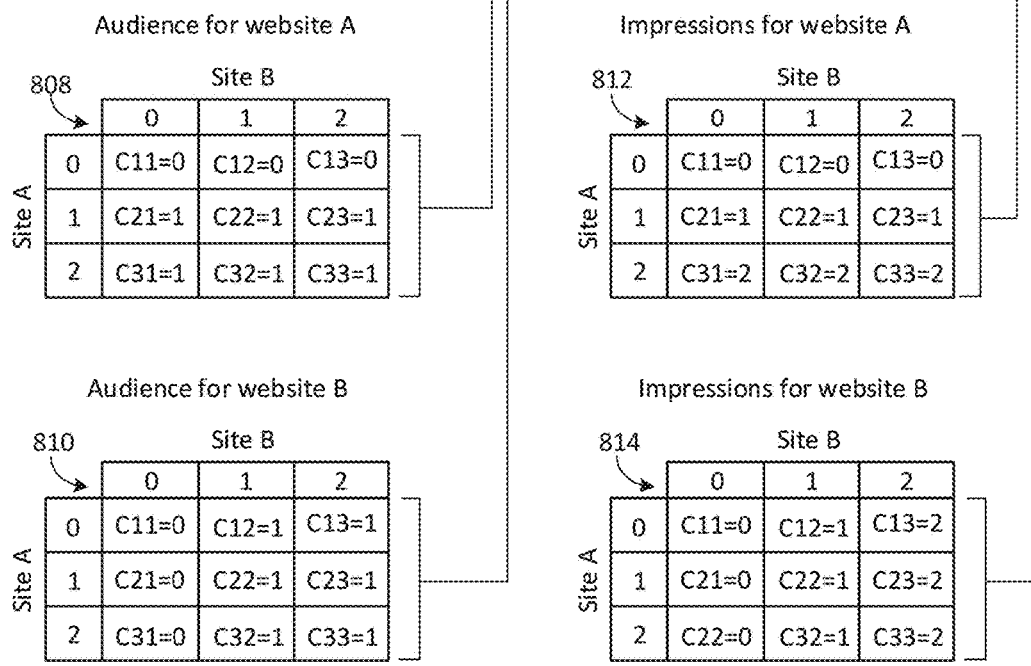
Figure 8C:
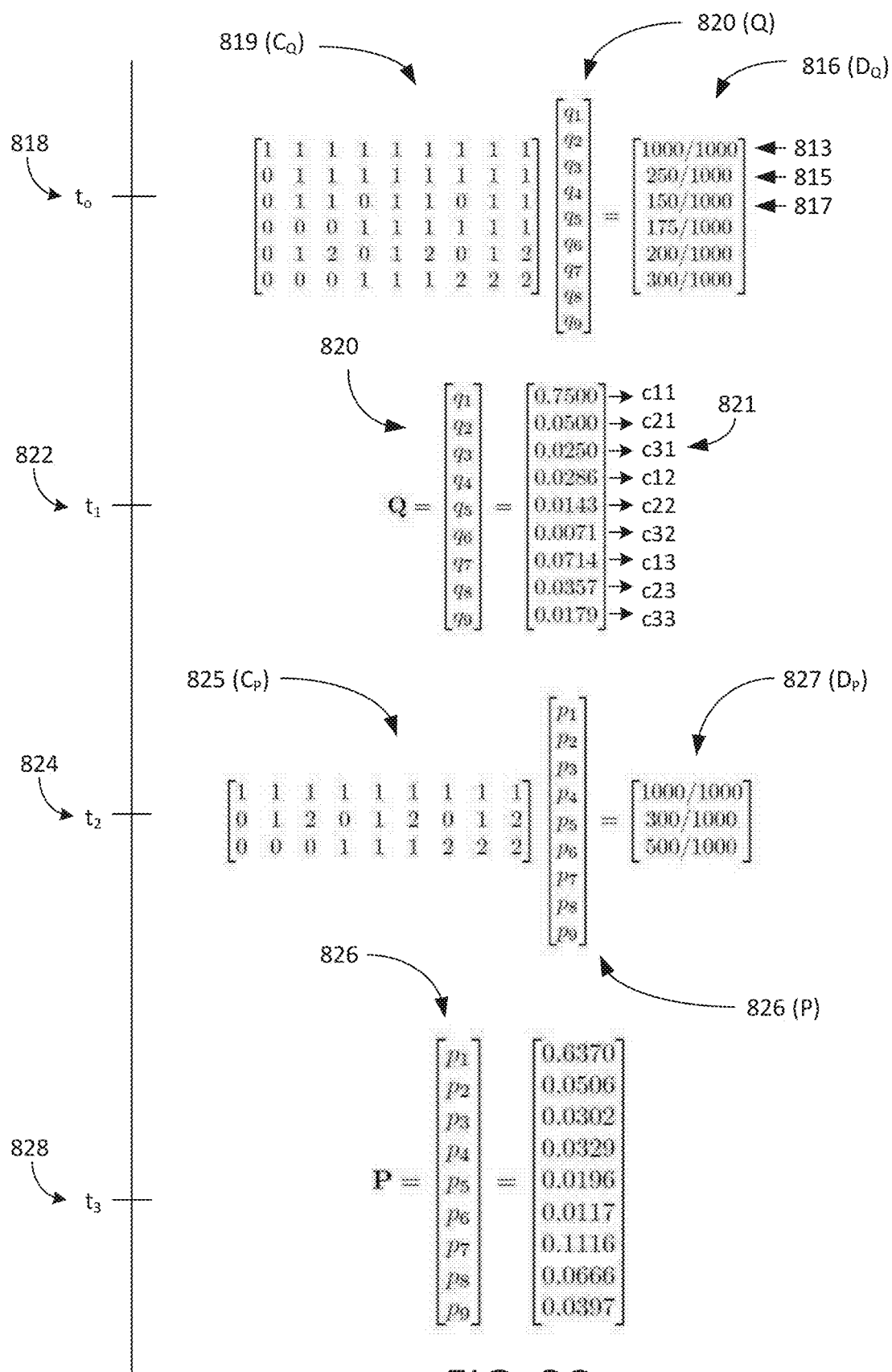

At block 608 of FIG. 6, the example impression data calculator 306 (FIG. 3) generates a constraint matrix (e.g., the example audience/impressions model constraint matrix 819 of FIG. 8C) based on audience and/or impression constraints and an example constraint vector (e.g., the example audience/impressions total constraint vector 816 of FIG. 8C) based on the total logged impressions and total audiences in the example table 800 of FIG. 8A. In some examples, the constraint matrix 819 is generated by gene sub-matrices that represent each constraint value of the constraint matrix 819. In the illustrated example of FIGS. 8A-8D, the sub-matrices that represent the constraints are an example total universe audience sub-matrix 804 via any website (FIG. 8B), an example total audience 806 via website A and website B (FIG. 8B), an example total audience for website A 808 (FIG. 8B), an example total audience for website B 810 (FIG. 8B), an example total logged impressions for website A 812 (FIG. 8B), and an example total logged impressions for website B 814 (FIG. 8B). Each illustrated example sub-matrix 804, 806, 808, 810, 812, 814 includes cells (e.g., c11, c12, c13, etc.) that represent data associated with each constraint. For example, the total universe sub-matrix 804 accounts for all users in a monitored or measured region (e.g., the universe) whether or not they were exposed to the media 100. Therefore, a '1' is placed in every cell to represent an audience member that was not exposed to the media 100 from either website (e.g., c11), an audience member that was only exposed to website B once and not to website A (e.g., c12), an audience member that was exposed to website B twice and not to website A (e.g., c12), etc.

FIG. 8B shows an example audience/impressions constraint matrix 802 that may be generated at block 608 of FIG. 6. The audience/impressions constraint matrix 802 is a matrix representing various parameters (e.g., the total population, the total audience for all monitored websites, the total audience of website A, etc. to which audience sizes are constrained. In the example audience/impressions constraint matrix 802, each cell of each constraint sub-matrix 804, 806, 808, 810, 812, 814 is represented as a row. In some examples, the example impression data calculator 306 generates the example audience/impressions constraint matrix 802 at block 608 directly without first generating the example sub-matrices 804, 806, 808, 810, 812, 814. The example impression data calculator 306 generates an example audience/impressions total column vector 816 based on the total number of logged impressions or audience associated with constraint in the corresponding row. For example, a first cell 813 in the example audience/impressions total constraint column vector 814 is the total number of people for the total audience, a second cell 815 is the total audience from website A and B, a third cell 817 is the total audience for website A, etc.

At block 610 of FIG. 6, the example impressions data calculator 306 applies the audience/impressions constraint matrix 802 and the example audience/impressions total constraint vector 803 to the property of maximum entropy distribution to solve the example impression characteristic vector 820 (Q) of Equation 18 below.

$$\text{maximize } Q, H = -\Sigma_{k=0}^{\infty} q_k \log(q_k), \quad \text{Equation 18}$$

subject to $C_Q Q = D_Q$.

Where $C_Q$ is the constraint matrix, $D_Q$ is the constraint vector, and Q is the impression characteristics. As disclosed above, the impressions characteristics (Q) include probabilities representing a number or people associated with zero impressions corresponding to website A and/or website B, one impression from website A and/or website B, two impressions from website A and/or website B, and/or any combination thereof. Example phases are shown in FIG. 8C for determining a unique audience and/or a frequency distribution. For example, a first phase of FIG. 8C at t0 shows an example equation is populated illustrating a non-linear equation (e.g., $C_Q Q = D_Q$) including an example constraint matrix ($C_Q$) 819, an example impression characteristic vector (Q) 820, and an example constraint vector ($D_Q$) 816 after the example impressions data calculator 306 (FIG. 3) applies the data of the example table 800 and the example sub-matrices 804-814 (FIG. 8B) to the example audience/impression constraint matrix 802 (FIG. 8B). The solution for the example impression characteristic vector (Q) 820 is shown at time $t_1$ 822 (FIG. 8C). Each cell in the impression characteristic vector (Q) 820 is associated with a particular cell of the example sub-matrices 804-814 (FIG. 8B). For example, impression characteristic q1 corresponds to sub-matrix cell c11 (e.g., the total number of people who were not exposed to the media 100 from either website A or website B), the impression characteristic q2 corresponds with sub-matrix cell c21 (e.g., the total number of people that were exposed to the media 100 accessed via website A once and not exposed to the media accessed via website B), the impression characteristic q3 corresponds with sub-matrix cell c31 (e.g., the total number of people that were exposed to the media 100 accessed via website A twice and not exposed to the media accessed via website B), etc. When the impression data calculator 306 multiplies the impression characteristic vector (Q) 820 by the universe population (e.g., 1000), the total number of people associated with the particular cell is obtained. For example, 0.2500 (e.g., an example impression characteristic q3 821)×1000=25 people who were exposed to the media 100 twice from website A and 0 times from website B.

Returning to FIG. 6, at block 612, the example audience data calculator 304 (FIG. 3) generates an example population constraint matrix 825 (FIG. 8C) based on the sub-matrices associated with the impression constraints (e.g., the example sub-matrices 804, 812, 814 of FIG. 8B) that the population must satisfy. Additionally, the example audience data calculator 304 generates an example population constraint vector 827 (FIG. 8C) based on the total logged impressions associated with the columns of the population constraint matrix 825 (FIG. 8C) that the population must satisfy.

At block 614 of FIG. 6, the example audience data calculator 304 determines audience characteristics by solving for population constraints. The audience characteristics vector (P) 826 includes probabilities representing the likelihood that a unique audience is associated with zero impressions corresponding to website A and/or website B, the likelihood that the unique audience is associated with one impression from website A and/or website B, the likelihood that the unique audience is associated with two impressions from website A and/or website B, and/or any combination thereof. For example, the audience data calculator 304 applies the population constraint matrix 825 (FIG. 8C) and the example population constraint vector 827 (FIG. 8C) to the property of maximum entropy distribution to solve the constraints P of Equation 19 below.

$$\text{minimize } P, D(P:Q) = p_k \log\left(\frac{p_k}{q_k}\right), \quad \text{Equation 19}$$

subject to $C_P P = D_P$.

In Equation 19 above, $C_P$ is the population constraint matrix based on the sub-matrices associated with the impression constraints (e.g., the example sub-matrices 804, 812, 814 of FIG. 8B) that the population must satisfy, $D_P$ is the population constraint vector, and population constraints (P) representative of the probabilities associated with the unique audience for website A, website B, and the total unique audience. Example phases are shown in FIG. 8C for determine audience characteristics. The second phase at time $t_2$ 824 is an example phase that follows the first phase at time $t_1$ 822. For example, the second phase of FIG. 8C at time $t_2$ 824 shows an example manner in which the audience data calculator 304 can generate an example equation illustrating the non-linear equation (e.g., $C_P P = D_P$) including the example population constraint matrix ($C_P$) 825, an example audience characteristic vector ($D_P$) 827, and the example audience constraint vector (P) 826. The solution for the example audience characteristic vector 826 is shown at time $t_3$ 828 of FIG. 8C.

Figure 8D:
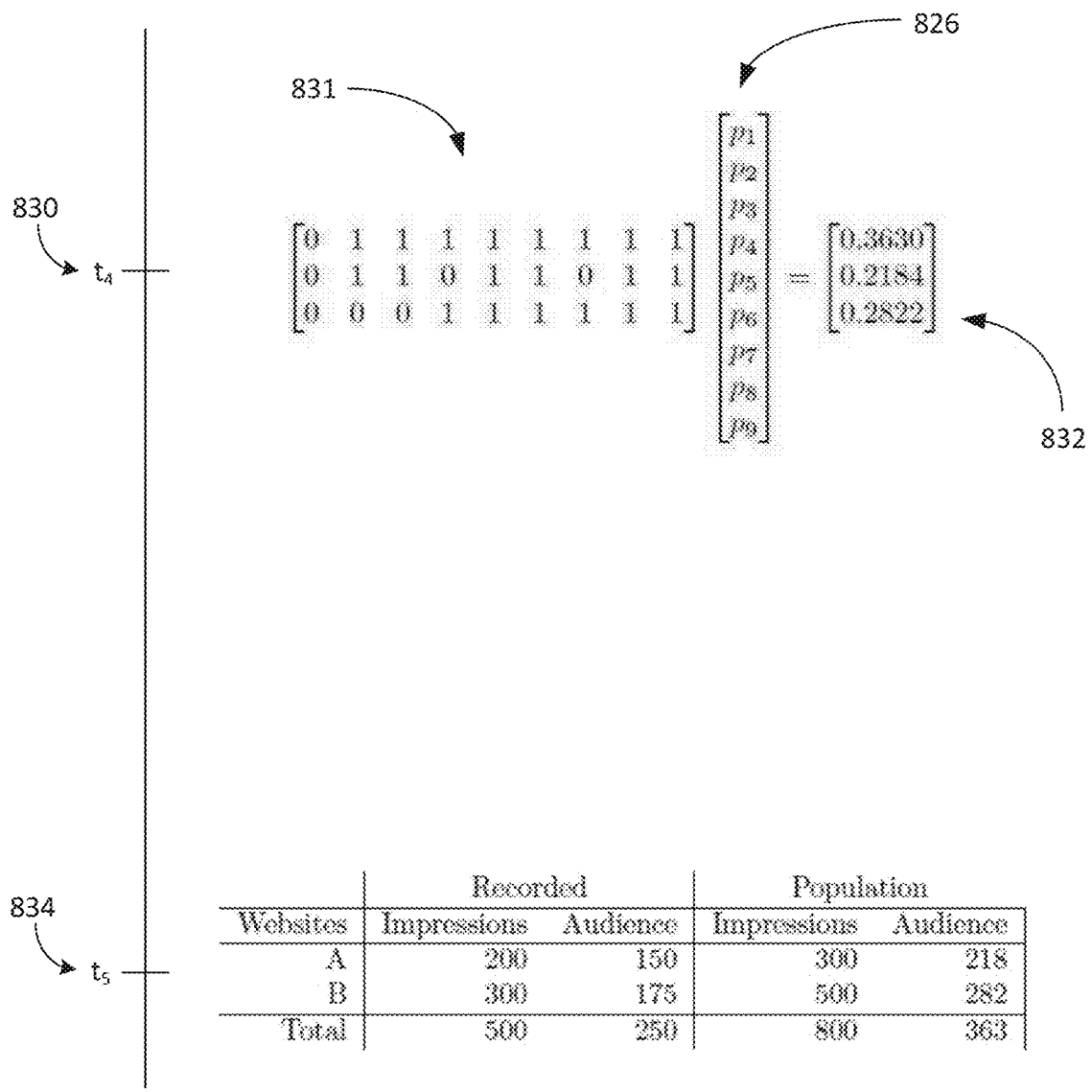

At block 616 of FIG. 6, the example audience data calculator 304 applies the audience characteristics to relevant constraints. For example, the relevant constraints are constraints related to the impressions corresponding to an audience of website A and website B (e.g., the total audience sub-matrix 806, the example impressions for website A sub-matrix 812, and the example sub-matrix for website B 814). Example phases are shown in FIG. 8D to determine a unique audience for website A, a unique audience for website B, and a total unique audience. The fourth phase at time $t_4$ 830 is an example phase that follows the third phase at time $t_3$ 828. For example, the fourth phase of FIG. 8D at time $t_4$ 830 shows an example equation representing how the unique audience is generated, the example unique audience matrix 831 has three rows to represents the three unique audience constraints (e.g., the example total audience 806, the example total audience for site A 808, and the example total unique audience for site B 810). The product of the audience constraints 831 and the example audience characteristics 826 is an example unique audience vector 832 representative of the probabilities associated with the unique audience for website A, website B, and the total unique audience. In such an example, the unique audience vector 832 may be multiplied by the universe population (e.g., 1000) to determine the unique audience for website A (e.g., 218), the unique audience for website B (e.g., 281), and the total unique audience (e.g., 363) for the example media 100, as shown at time $t_5$ 834.

At block 618 of FIG. 6, the example report generator 308 (FIG. 3) generates a report for the unique audience and/or the frequency distribution. As described above, the report may include any data related to the aggregate database proprietor impression data, the monitored website(s), demographic data, and/or the logged media impressions. In some examples, the report generator 308 credits media associated with impression data in the report based on the unique audience and/or the frequency distribution. For example, the report generator 308 may credit the media 100 (FIGS. 1A-1C and 2) by storing one or more of any type of impression data and/or demographic impression data in association with a media identifier of the media 100 in a machine readable memory (e.g., one or more of the memories 1014, 1016 of FIG. 10).

Figure 7:
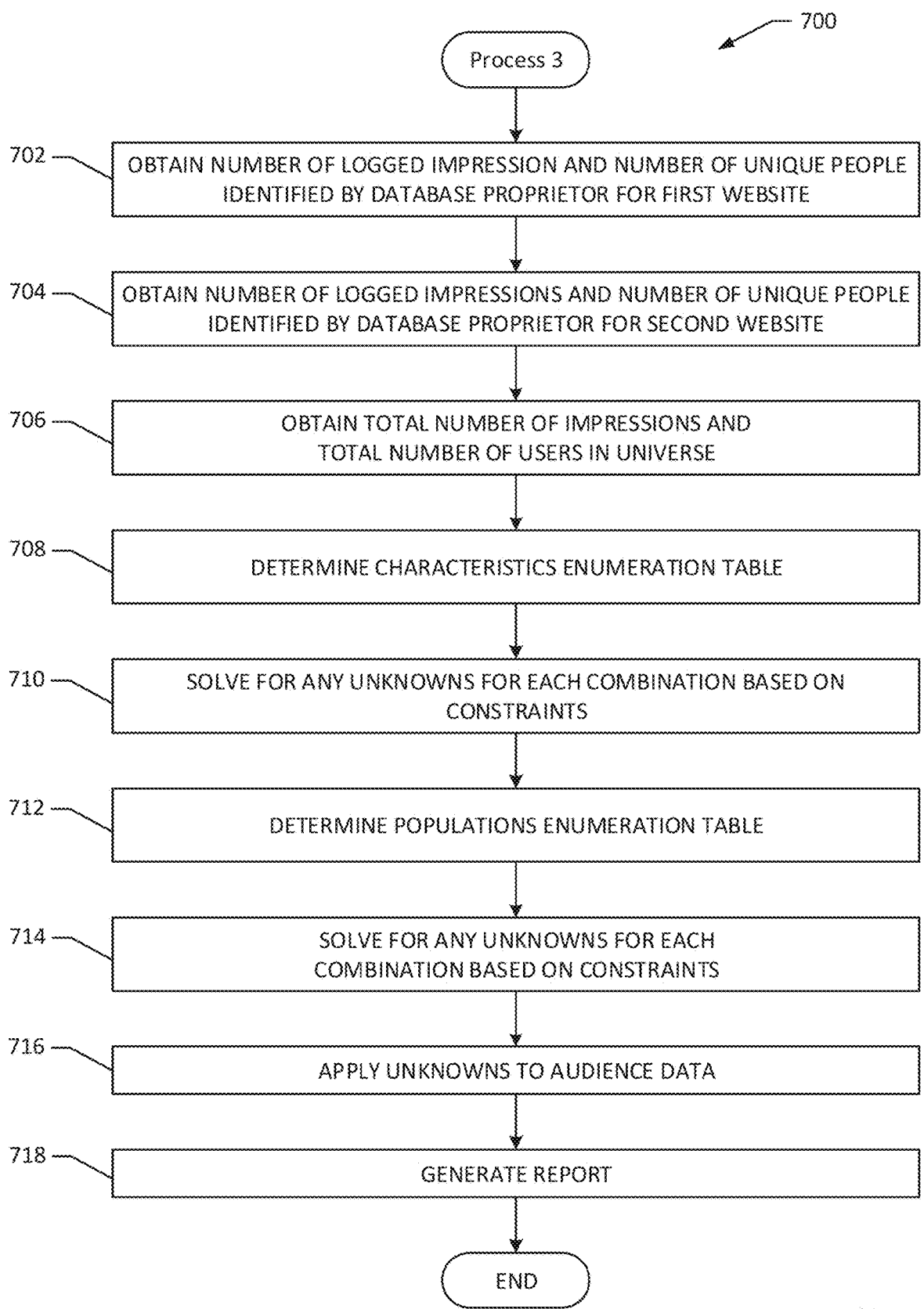

FIG. 7 is an example flowchart 700 representative of example machine readable instructions that may be executed to implement the example audience/impressions determiner 214 of FIGS. 2 and 3 to determine a unique audience for the example media 100 associated with two websites (e.g., the example websites 109 of FIG. 1C) and/or a frequency distribution of the unique audience(s) based on logged impressions of the media 100 using the example UA/FD process 3 103 (FIG. 1A-1C). The example flowchart is described in conjunction with an example shown in FIG. 9. FIG. 9 represents logged impressions associated with the media 100 accessed via a large number of websites (e.g., the example websites 109) where each user may be exposed to the media 100 any number of times. As shown in FIG. 9, the unique audience for website A is herein referred to as "X1," the unique audience for website B is herein referred to as "X2," and the total unique audience is herein referred to as "X." Although the example flowchart 700 is described in conjunction with an example of two websites with an infinite number of logged impressions website, any number of websites and/or logged impressions may be used.

At block 702 of FIG. 7, the example data interface 300 of FIG. 3 obtains a number of logged media impressions (e.g., database proprietor demographic impressions) and a number of unique people identified by the example database proprietor 210 in connection with accesses to the example media 100 via a first website (e.g., website A). In the illustrated example table 900 of FIG. 9, the example receiver obtains a count of 200 logged database proprietor demographic impressions that correspond to 150 unique people (e.g., the audience) that accessed the media 100 via website A and that are registered users of the database proprietor (e.g., the website A partial audience corresponding to registered database proprietor users) associated with the media 100.

At block 704 of FIG. 7, the example data interface 300 obtains a number of logged impression (e.g., database proprietor demographic impressions) and a number of unique people identified by the example database proprietor 210 as accessing the example media 100 via a second website (e.g., Website B). As described above in connection with FIG. 2, the database proprietor 210 that logged impressions for website B may or may not be the same as the database proprietor 210 that logged impressions for website A. In the illustrated example table 900 of FIG. 9, the example receiver obtains a count of 300 database proprietor demographic logged impressions that correspond to 175 unique people that accessed the media 100 via website B and that are registered users of the database (e.g., the website B partial audience corresponding to registered database proprietor users).

At block 706 of FIG. 7, the example data interface 300 obtains a total number of impressions (e.g., media impressions) corresponding to the example client devices 202 and a total number of client devices 202 in a monitored region (e.g., a universe). In some examples, the impressions are logged by server 213 (FIG. 2) based on the impression requests 206 sent by client devices 202 (FIG. 2) via the network 204. In some examples, the data interface 300 logs the media impressions corresponding to the media 100 (FIG. 2) accessed at the client devices 202 (FIG. 2). In some examples, the example data interface 300 receives a total number or count of the logged impressions associated with accesses to the media 100 via website A and a total number or count of the logged impressions associated with accesses to the media 100 via website B. Example phases are shown in FIG. 9 for determining a unique audience and/or frequency distribution for media impressions. For example, a first phase of FIG. 9 at time $t_0$ 900 shows an example table that includes a count of 300 logged database proprietor demographic impressions associated with website A, a count of 500 logged database proprietor demographic impressions associated with website B, and a count of 800 total logged media impressions. Additionally, the universe population in the illustrated example is 1,000 users (not shown).

At block 708 of FIG. 7, the example impression data determiner 306 (FIG. 3) calculates an enumeration table based on the data in the example table 900 (FIG. 9) and the principles of an infinite geometric series. Based on derivations of the infinite geometric series, a value for each entry in an example combination table can be determined shown at time $t_1$ 902 (FIG. 9). Each entry is determined based on the following formula for logged impressions:

$$\sum_{i=1}^{\infty}\sum_{j=1}^{\infty}\sum_{k=1}^{\infty} z_1^{(a_0+a_1 i+a_2 j+a_3 k)} z_2^{(b_0+b_1 i+b_2 j+b_3 k)} = \frac{z_1^{(a_0+a_1+a_2+a_3)} z_2^{(b_0+b_1+b_2+b_3)}}{\left(1-z_1^{a_1} z_2^{b_1}\right)\left(1-z_1^{a_2} z_2^{b_2}\right)^2 \left(1-z_1^{a_3} z_2^{b_3}\right)}$$

Where variable $z_i$ is representative of the $i^{th}$ website. The following formula is used for the audiences:

$$\sum_{i=1}^{\infty}\sum_{j=1}^{\infty}\sum_{k=1}^{\infty} z_1^{(a_0+a_1 i+a_2 j+a_3 k)} z_2^{(b_0+b_1 i+b_2 j+b_3 k)} = \frac{z_1^{(a_0+a_1+a_2+a_3)} z_2^{(b_0+b_1+b_2+b_3)}}{\left(1-z_1^{a_1} z_2^{b_1}\right)\left(1-z_1^{a_2} z_2^{b_2}\right)^2 \left(1-z_1^{a_3} z_2^{b_3}\right)}.$$

For example, the value associated with impression combination I2 in the example combination table is represented by:

$$\sum_{i=1}^{\infty} i \times (z_1^{(R)})^i z_1^{(A)} z_A z_* = \frac{z_1^{(R)} z_1^{(A)} z_A z_*}{(1-z_1^{(R)})^2}$$

Additionally, the value associated with impression combination I3 in the example combination table is represented by:

$$\sum_{j=1}^{\infty}\sum_{i=1}^{\infty} i*(z_1^{(R)})^i (z_2^{(R)})^j z_1^{(A)} z_2^{(A)} z_* = \frac{z_1^{(R)} z_2^{(R)} z_1^{(A)} z_2^{(A)} z_A z_*}{(1-z_1^{(R)})^2 (1-z_2^{(R)})}$$

Since a sum of the impression combinations I2, I3 (e.g., I2+I3) represents all the logged database proprietor demographic impressions accessed via website A, then I2+I3=200/1000 (e.g., the logged database proprietor demographic impressions accessed via website A/the universal population). Additional equations can be determined using a similar manner (e.g., I1+I4=300/1000, etc.) The result is N equations (e.g., one for each constraint) with N unknowns (e.g. the z variables). A third phase of FIG. 9 at time $t_2$ 904 shows an example manner in which the example impressions data calculator 306 (FIG. 3) may determine an enumeration table based on a solution of the non-linear system of equation. The enumeration table completely describes the logged impressions and audience recorded by the database proprietor. The enumeration table is representative of logged database proprietor demographic impressions across the registered users of each website.

A fourth phase of FIG. 9 at time $t_3$ 906 show an example manner in which the example audience data determiner 304 may calculate an example population enumeration table (block 712). The example population enumeration table represents the estimated distribution of logged impression across the total unique audience. The example population enumeration table may be used to estimate the population parameters where some of the z variables will be related to known population constraints (block 712). The population constraints are representative of a total of logged impressions for media accessed via each website (e.g., both impressions logged by the database proprietor and not logged by the database proprietor). For example, as shown in the table at time $t_0$, website A includes a total of 200 database proprietor demographic impressions recorded (e.g., logged) by a database proprietor and a total of 300 impressions for the population (e.g., 100 impressions were not logged by the database proprietor). Based on derivations of the infinite geometric series, the example impression data calculator 306 (FIG. 3) determines a value for each entry in an example combination table shown at time $t_1$ 902 (FIG. 9). For example, the value associated with audience combination A2 in the example combination table shown at time $t_1$ 902 (FIG. 9) is represented by:

$$\sum_{i=1}^{\infty} i \times (z_1^{(T)})^i z_1^{(X)} z_X z_* = \frac{z_1^{(T)} z_2^{(A)} z_X \check{z}_*}{(1-z_1^{(T)})^2}$$

Additionally, the value associated with audience combination A3 in the example combination table shown at time $t_2$ 904 is represented by:

$$\sum_{j=1}^{\infty}\sum_{i=1}^{\infty} i*(z_1^{(T)})^i (z_2^{(T)})^j z_1^{(X)} z_2^{(X)} z_* = \frac{z_1^{(T)} z_2^{(T)} z_1^{(T)} z_2^{(T)} z_X \check{z}_*}{(1-z_1^{(T)})^2 (1-z_2^{(T)})}$$

Since the sum of the audience combinations A2, A3 (e.g., A2+A3) represents the audience exposed to the media 100 accessed via website A, then A2+A3=300/1000 (e.g., the logged impressions associated with the population audience of website A/the universal population). Additional equations can be determined using a similar manner (e.g., A1+A4=500/1000, etc.) This particular mathematical problem creates three equations with three unknowns (e.g., $z_1^{(X)}$, $z_2^{(X)}$, ž.). The example audience data calculator 304 (FIG. 3) solves for any unknowns for each combination based on the constraints (e.g., A2+A3=300/1000, A1+A4=500/1000, etc.). For example, the example audience data calculator 304 may determine the example population enumeration table of time $t_3$ 906 of FIG. 9 by solving the non-linear system of equation for the three unknowns (block 714). The example population enumeration table completely describes the logged impressions and audience recorded by the database proprietor. Any value of interest from that distribution (e.g., frequency distribution, audiences, or conditional probabilities, can be determined using the z values of the example enumeration table (e.g., optimizing both memory and speed).

At block 716 of FIG. 7, the example audience data determiner 304 (FIG. 3) applies the unknowns to audience data (e.g., the unique audience for website A, the unique audience for website B, etc.). For example, the expressions of the cells of the example table shown at time $t_1$ 902 (FIG. 9) associated with the example audience (e.g., A1, A2, A3, A4, and zA) are shown in an example population table shown (e.g., i, ii, iii, iv, v, vi, and vii) at time $t_4$ 908 (FIG. 9). After a value for each cell has been calculated, the appropriate cells are summed and multiplied by the total universe (UA) to determine the unique audience from website A, the unique audience of website B, and the total unique audience, as shown below and in an example result table shown at time $t_5$ 910 (FIG. 9):

$X_1$=UA ((i)+(ii))=1000 (0.08654+0.122699)=209.24 (e.g., unique audience of website A)

$X_2$=UA ((iii)+(iv))=1000 (0.125720+0.122699)=248.42 (e.g., unique audience of website B)

$X_3$=UA ((v)+(vi)+(vii))=1000 (0.08654+0.125720+0.122699)=334.96 (e.g., total unique audience)

At block 718 of FIG. 7, the example report generator 308 (FIG. 3) generates a report that includes the unique audience and/or the frequency distribution. As described above, the report may include any data related to the aggregate database proprietor impression data, the website, demographic data, and/or the logged impressions. In some examples, the report generator 308 (FIG. 3) credits media associated with a logged impression based on the unique audience and/or the frequency distribution. For example, the report generator 308 may credit the media 100 (FIGS. 1A-1C and 2) by storing one or more of any type of impression data and/or demographic impressions data in association with a media identifier of the media 100 in a machine readable memory (e.g., one or more of the memories 1014, 1016 of FIG. 10).

Figure 10:
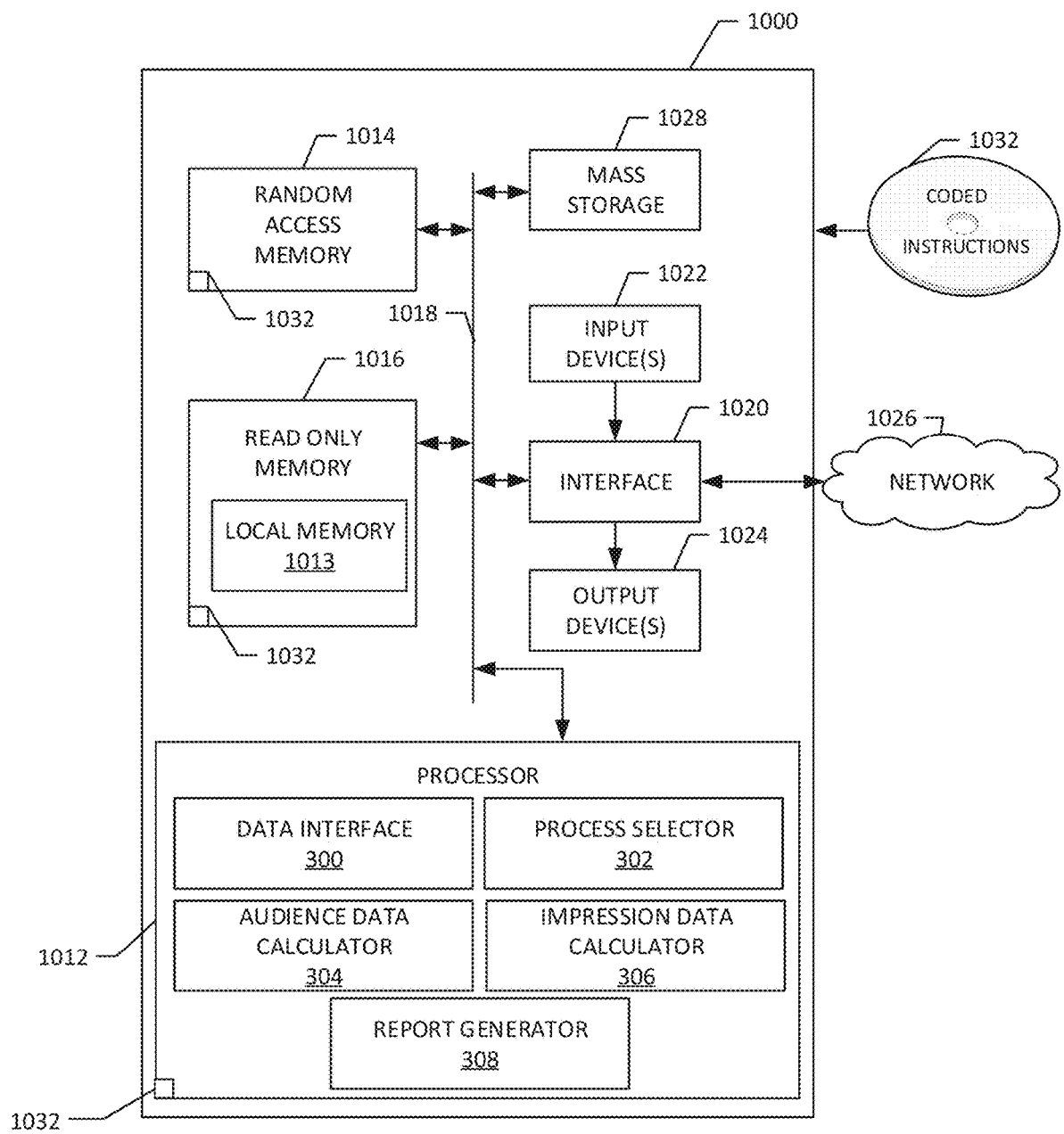
FIG. 10 is a block diagram of an example processor platform that may be utilized to execute the example instructions of FIGS. 4-7 to implement the example audience/impression determiner of FIG. 2 and/or FIG. 3.

FIG. 10 is a block diagram of an example processor platform 1000 capable of executing the instructions of FIGS. 4-7 to implement the example memory controller 202 of FIG. 2. The processor platform 1000 can be, for example, a server, a personal computer, a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by integrated circuits, logic circuits, microprocessors or controllers from any desired family or manufacturer.

The processor 1012 of the illustrated example includes the example memory 212 (e.g., a cache). The example processor 1012 of FIG. 10 executes the instructions of FIGS. 4-7 to implement the example data interface 300, the example process selector 302, the example audience data calculator 304, the example impression data calculator 306, and the example report generator 308 of FIG. 3 to implement the example audience/impression determiner 214. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 4-7 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed examples may be used to select a UA/FD process that based on both processor resources and memory resources to provide estimations of unique audiences (e.g., a unique audience for a particular website and/or a total unique audience) that is more accurate than prior techniques by using counts of logged impressions and a number of unique people identified by a database proprietor (e.g., a partial audience). Using examples disclosed herein, unique audiences can be determined in a faster and more accurate manner with less required memory resources.

Prior techniques for determining a unique audience for a media presentation include simple scaling or negative binomial distribution. However, simple scaling is inaccurate, negative binomial distribution includes computations requiring a large amount of processor resources, and both simple scaling and negative binomial distribution cannot determine a unique audiences for particular websites and a total unique audience. Examples disclosed herein alleviate such problems by selecting one of three UA/FD processes based on available processor resources and memory resources to determine a unique audience and/or a frequency distribution of impressions for a media presentation. Additionally, two of the three UA/FD processes disclosed herein determine a unique audience based on instructions to measure media exposure accessed via more than one website leading to more accurate estimations.

Example methods are disclosed to determine a unique audience exposed to media. Such example methods include receiving impression requests at a server from a plurality of client devices via a network. Such example methods include, based on the impression requests, logging, with the server, a plurality of impressions corresponding to the media accessed at the client devices; obtaining a number of demographic impressions logged by a database proprietor; obtaining a number of registered users of the database proprietor exposed to the media; multiplying, by executing an instruction with a processor, a number of the plurality of impressions by a square of the number of the registered users to generate a product; dividing, by executing an instruction with the processor, the product by the number of the demographic impressions to generate a quotient; and determining, by executing an instruction with the processor, the unique audience based on a square root of the quotient.

In some example methods, the registered users of the database proprietor exposed to the media correspond to the demographic impressions and to at least some of the plurality of impressions. In some examples, the crediting of the media is associated with the plurality of impressions based on the unique audience. In some examples, a frequency distribution is determined for the plurality of impressions based on the unique audience by: dividing the unique audience by the number of the plurality of impressions to determine a second quotient; and calculating a geometric distribution based on the second quotient.

Example methods are disclosed to determine a unique audience exposed to media. Such example methods include receiving impression requests at a server from a plurality of client devices via a network. Such example methods include, based on the impression requests, logging, with the server, a plurality of impressions corresponding to the media accessed at the client devices; obtaining a first number of first demographic impressions corresponding to the media accessed via a first website and logged by a first database proprietor, the first demographic impressions corresponding to first registered users of the first database proprietor; obtaining a second number of second demographic impressions corresponding to the media accessed via a second website and identified by a second database proprietor, the second demographic impressions corresponding to second registered users of the second database proprietor; obtaining a first number of the first registered users exposed to the media; obtaining a second number of the second registered users exposed to the media; generating, by executing an instruction with a processor, a constraint matrix and a constraint vector based on the first number of the first demographic impressions and the second number of the second demographic impressions, the constraint vector representative of a plurality of ratios of constraints to a number of the plurality of impressions; determining, by executing an instruction with the processor, audience characteristics based on the constraint matrix and the constraint vector; and determining, by executing an instruction with the processor, a first unique audience exposed to the media via the first website, a second unique audience exposed to the media via the second website, and a total unique audience exposed to the media via the first and second websites based on the audience characteristics.

In some example methods, the total unique audience is a count of unique audience members across the first unique audience and the second unique audience. In some example methods, the constraint matrix is a first constraint matrix and the constraint vector is a first constraint vector, and further including determining the first unique audience, the second unique audience, and the total unique audience by: generating the first constraint matrix and the first constraint vector based on the first number of the first demographic impressions, the first number of the first registered users, the second number of the second demographic impressions, and the second number of the second registered users; determining the impression characteristics associated with the first constraint matrix and the first constraint vector, the impression characteristics including maximized values based on the first constraint matrix and the first constraint vector; and generating a second constraint matrix and a second constraint vector based on the impression characteristics, the audience characteristics including maximized values based on the second constraint matrix and the second constraint vector, the first unique audience, the second unique audience, and the total unique audience being based on the audience characteristics.

In some example methods, a frequency distribution is determined based on the impression characteristics. In some example methods, the impression characteristics include probabilities representing likelihoods of different numbers of people exposed to the media via at least one of the first website or the second website. In some example methods, the audience characteristics include probabilities representing likelihoods of different sizes of unique audiences corresponding to at least one of the first website or the second website. In some example methods, the first database proprietor is the second database proprietor. In some example methods, a report is generated indicating at least one of the first unique audience, the second unique audience, or the total unique audience.

In some example methods, the media associated with the plurality of impressions is credited based on at least one of the first unique audience, the second unique audience, or the total unique audience. In some example methods, the constraint matrix includes constraints represented in sub-matrices, the constraints including at least one of a first size of a first audience exposed to the media via the first website, a second size of a second audience exposed to the media via the second website, a third size of a total audience exposed to the media via the first and second websites, a fourth size of a universe audience via any website, a first count of first impressions corresponding to the media accessed via the first website, and a second count of second impressions corresponding to the media accessed via the second website.

Example methods are disclosed to determine a unique audience exposed to media. Such example methods include receiving impression requests at a server from a plurality of client devices via a network. Such examples include, based on the impression requests, logging, with the server, a plurality of impressions corresponding to the media accessed at the client devices; obtaining a first number of first demographic impressions corresponding to the media accessed via a first website and logged by a first database proprietor, the first demographic impressions corresponding to first registered users of the first database proprietor; obtaining a second number of second demographic impressions corresponding to the media accessed via a second website and logged by a second database proprietor, the second demographic impressions corresponding to second registered users of the second database proprietor; obtaining a first number of the first registered users exposed to the media; obtaining a second number of the second registered users exposed to the media; determining, by executing an instruction with a processor, a first enumeration table, the first enumeration table including first values based on a system of non-linear equations associated with the first number of the first demographic impressions, the first number of the first registered users, the second number of the second demographic impressions and the second number of the second registered users; determining, by executing an instruction with the processor, a second enumeration table including second values based on a second system of non-linear equations associated with the first values calculated in the first enumeration table and the plurality of impressions; and determining, by executing an instruction with the processor, a first unique audience of the media accessed via the first website, a second unique audience of the media accessed via the second website, and a total unique audience of the media accessed via the first and second websites using second expressions solved based on the second values in the second enumeration table.

In some example methods, the first enumeration table is an estimated distribution of the plurality of impressions across the first registered users and the second registered users. In some example methods, the second enumeration table is an estimated distribution of the plurality of impressions across the total unique audience. In some example methods, a frequency distribution of impressions for the total unique audience is determined based on the second enumeration table.

In some example methods, the second enumeration table is based on population constraints. In such example methods, the population constraints are representative of: a third number of the first demographic impressions corresponding to the media accessed via the first website, the third number of the first demographic impressions including the first number of the first demographic impressions; and a fourth number of the second demographic impressions corresponding to the media accessed via the second website, the fourth number of the second demographic impressions including the second number of the second demographic impressions.

In some examples, the first database proprietor is the second database proprietor. In some examples, a report is generated indicating at least one of the first unique audience, the second unique audience, or the total unique audience. In some examples, the media associated with the plurality of impressions is credited based on at least one of the first unique audience, the second unique audience, or the total unique audience.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a server to, based on impression requests from a plurality of client devices via a network, log a plurality of impressions corresponding to media accessed at the client devices;
   an interface to:
     obtain a count of demographic impressions logged by a database proprietor; and
     obtain a count of registered users of the database proprietor exposed to the media; and
   a processor to execute instructions to determine a unique audience size by:
     multiplying a count of the plurality of impressions by a square of the count of the registered users to generate a product;
     dividing the product by the count of the demographic impressions to generate a quotient; and
     determining the unique audience size based on a square root of the quotient.

2. The apparatus of claim 1, wherein the processor is to determine the unique audience size based on the square root of the quotient when the unique audience size is not available from a server of the database proprietor.

3. The apparatus of claim 1, wherein the instructions are first instructions, the processor to select the first instructions to determine the unique audience size instead of second instructions to determine the unique audience size, the first instructions to cause more resource-efficient operation of a computer than the second instructions by utilizing less processor resources and memory resources than the second instructions.

4. The apparatus of claim 1, wherein the registered users of the database proprietor exposed to the media correspond to the demographic impressions and to at least some of the plurality of impressions.

5. The apparatus of claim 1, wherein the processor is to generate a report indicating the unique audience size.

6. The apparatus of claim 1, wherein the processor is to credit the media associated with the plurality of impressions based on the unique audience size.

7. The apparatus of claim 1, wherein the processor is to determine a frequency distribution for the plurality of impressions based on the unique audience size by:
   dividing the unique audience size by the count of the plurality of impressions to determine a second quotient; and
   calculating a geometric distribution based on the second quotient.

8. An apparatus comprising:
   a server to, based on impression requests from a plurality of client devices via a network, log a plurality of impressions corresponding to media accessed at the client devices;
   an interface to:
     obtain a first count of first demographic impressions corresponding to the media accessed via a first website and logged by a first database proprietor, the first demographic impressions corresponding to first registered users of the first database proprietor;
     obtain a second count of second demographic impressions corresponding to the media accessed via a second website and identified by a second database proprietor, the second demographic impressions corresponding to second registered users of the second database proprietor;
     obtain a first count of the first registered users exposed to the media; and
     obtain a second count of the second registered users exposed to the media; and
   a processor to:
     generate a constraint matrix and a constraint vector based on the first count of the first demographic impressions and the second count of the second demographic impressions, the constraint vector representative of a plurality of ratios of constraints to a count of the plurality of impressions; and
     determine a first unique audience size exposed to the media via the first website, a second unique audience size exposed to the media via the second website, and a total unique audience size exposed to the media via the first and second websites based on the constraint matrix and the constraint vector.

9. The apparatus of claim 8, wherein the processor is to determine the first unique audience size, the second unique audience size, and the total unique audience size when the first unique audience size, the second unique audience size, and the total unique audience size are not available from a server of the database proprietor.

10. The apparatus of claim 8, wherein the total unique audience size is a count of unique audience members across the first unique audience size and the second unique audience size.

11. The apparatus of claim 8, wherein the constraint matrix is a first constraint matrix and the constraint vector is a first constraint vector, and the processor is to determine the first unique audience size, the second unique audience size, and the total unique audience size by:
  generating the first constraint matrix and the first constraint vector based on the first count of the first demographic impressions, the first count of the first registered users, the second count of the second demographic impressions, and the second count of the second registered users;
  determining impression characteristics associated with the first constraint matrix and the first constraint vector, the impression characteristics including maximized values based on the first constraint matrix and the first constraint vector; and
  generating a second constraint matrix and a second constraint vector based on the impression characteristics, the first and second constraint matrices and the first and second constraint vectors corresponding to audience characteristics, the audience characteristics including maximized values based on the second constraint matrix and the second constraint vector, the first unique audience size, the second unique audience size, and the total unique audience size being based on the audience characteristics.

12. The apparatus of claim 11, wherein the processor is to determine a frequency distribution based on the impression characteristics.

13. The apparatus of claim 11, wherein the impression characteristics include probabilities representing likelihoods of different numbers of people exposed to the media via at least one of the first website or the second website.

14. The apparatus of claim 11, wherein the audience characteristics include probabilities representing likelihoods of different sizes of unique audiences corresponding to at least one of the first website or the second website.

15. The apparatus of claim 8, wherein the first database proprietor is the second database proprietor.

16. The apparatus of claim 8, wherein the processor is to generate a report indicating at least one of the first unique audience size, the second unique audience size, or the total unique audience size.

17. The apparatus of claim 8, wherein the processor is to credit the media associated with the plurality of impressions based on at least one of the first unique audience size, the second unique audience size, or the total unique audience size.

18. The apparatus of claim 8, wherein the constraint matrix includes constraints represented in sub-matrices, the constraints including at least one of a first size of a first audience exposed to the media via the first website, a second size of a second audience exposed to the media via the second website, a third size of a total audience exposed to the media via the first and second websites, a fourth size of a universe audience via any website, a first count of first impressions corresponding to the media accessed via the first website, and a second count of second impressions corresponding to the media accessed via the second website.

19. An apparatus comprising:
  a server to, based on impression requests from a plurality of client devices via a network, log a plurality of impressions corresponding to media accessed at the client devices;
  an interface to:
    obtain a first count of first demographic impressions corresponding to the media accessed via a first website and logged by a first database proprietor, the first demographic impressions corresponding to first registered users of the first database proprietor;
    obtain a second count of second demographic impressions corresponding to the media accessed via a second website and logged by a second database proprietor, the second demographic impressions corresponding to second registered users of the second database proprietor;
    obtain a first count of the first registered users exposed to the media; and
    obtain a second count of the second registered users exposed to the media; and
  a processor to:
    determine a first enumeration table, the first enumeration table including first values based on a system of non-linear equations associated with the first count of the first demographic impressions, the first count of the first registered users, the second count of the second demographic impressions and the second count of the second registered users;
    determine a second enumeration table including second values based on a second system of non-linear equations associated with the first values calculated in the first enumeration table and the plurality of impressions; and
    determine a first unique audience size of the media accessed via the first website, a second unique audience size of the media accessed via the second website, and a total unique audience size of the media accessed via the first and second websites using second expressions solved based on the second values in the second enumeration table.

20. The apparatus of claim 19, wherein the processor is to determine the first unique audience size, the second unique audience size, and the total unique audience size when the first unique audience size, the second unique audience size, and the total unique audience size are not available from a server of the database proprietor.

21. The apparatus of claim 19, wherein the first enumeration table is an estimated distribution of the plurality of impressions across the first registered users and the second registered users.

22. The apparatus of claim 19, wherein the second enumeration table is an estimated distribution of the plurality of impressions across the total unique audience size.

23. The apparatus of claim 22, wherein the processor is to determine a frequency distribution of impressions for the total unique audience size based on the second enumeration table.

24. The apparatus of claim 19, wherein the second enumeration table is based on population constraints, the population constraints representative of:
  a third count of the first demographic impressions corresponding to the media accessed via the first website, the third count of the first demographic impressions including the first count of the first demographic impressions; and
  a fourth count of the second demographic impressions corresponding to the media accessed via the second website, the fourth count of the second demographic impressions including the second count of the second demographic impressions.

25. The apparatus of claim 19, wherein the first database proprietor is the second database proprietor.

26. The apparatus of claim 19, wherein the processor is to generate a report indicating at least one of the first unique audience size, the second unique audience size, or the total unique audience size.

27. The apparatus of claim 19, wherein the processor is to credit the media associated with the plurality of impressions based on at least one of the first unique audience size, the second unique audience size, or the total unique audience size.

* * * * *